(12) United States Patent
Andersen

(10) Patent No.: US 9,255,017 B2
(45) Date of Patent: Feb. 9, 2016

(54) LIQUID TREATMENT METHODS AND APPARATUS

(75) Inventor: Aage Bjorn Andersen, Hovik (NO)

(73) Assignee: OCEANSAVER AS, Lysaker (NO)

(*) Notice: Subject to any disclaimer, the term of this patent is extended or adjusted under 35 U.S.C. 154(b) by 1698 days.

(21) Appl. No.: 12/446,133

(22) PCT Filed: Oct. 12, 2007

(86) PCT No.: PCT/GB2007/003903
§ 371 (c)(1),
(2), (4) Date: Apr. 17, 2009

(87) PCT Pub. No.: WO2008/047084
PCT Pub. Date: Apr. 24, 2008

(65) Prior Publication Data
US 2010/0326925 A1    Dec. 30, 2010

(30) Foreign Application Priority Data

Oct. 20, 2006  (GB) .................................. 0620942.3
Feb. 23, 2007  (GB) .................................. 0703598.3

(51) Int. Cl.
*C02F 1/34*        (2006.01)
*C02F 1/469*      (2006.01)
(Continued)

(52) U.S. Cl.
CPC . *C02F 1/469* (2013.01); *C02F 1/34* (2013.01); *C02F 1/36* (2013.01); *C02F 1/4693* (2013.01); *C02F 1/4695* (2013.01); *C02F 2103/008* (2013.01); *C02F 2209/04* (2013.01); *C02F 2209/06* (2013.01); *C02F 2209/29* (2013.01)

(58) Field of Classification Search
USPC ........... 210/764, 748.03, 748.01, 150, 748.04
See application file for complete search history.

(56) References Cited

U.S. PATENT DOCUMENTS

| | | |
|---|---|---|
| 3,594,115 A | 7/1971 | Wesley et al. |
| 4,084,757 A | 4/1978 | Rakitin et al. |

(Continued)

FOREIGN PATENT DOCUMENTS

| | | |
|---|---|---|
| CN | 1736798 A | 2/2006 |
| DE | 2733000 C2 | 1/1979 |

(Continued)

OTHER PUBLICATIONS

EP Examination Report dated Feb. 11, 2011, Application No. 07 824 154.4-1213, Ref. 12.91654/11, Applicant—OceanSaver AS, Communication pursuant to Article 94(3) EPC, 15 pages.

(Continued)

*Primary Examiner* — Bobby Ramdhanie
*Assistant Examiner* — Denise R Anderson
(74) *Attorney, Agent, or Firm* — Rothwell, Figg, Ernst & Manbeck PC

(57) ABSTRACT

A liquid or water treatment apparatus comprising one or both of an electrodialysis cell and a cavitation unit. The cavitation unit generates cavitation in the liquid by flow of the liquid into a constriction where cavitation bubbles are formed and then to an outlet where cavitation bubbles implode, and the constriction includes an aperture formed by walls which are long and narrowly spaced in a plane normal to the flow direction. The electrodialysis cell is arranged with an inlet flow path for directing only part of a quantity of water to be treated through the electrodialysis cell, and an outlet flow path for returning a product of the electrodialysis cell to the remainder of the water.

13 Claims, 12 Drawing Sheets

Figure 1A:
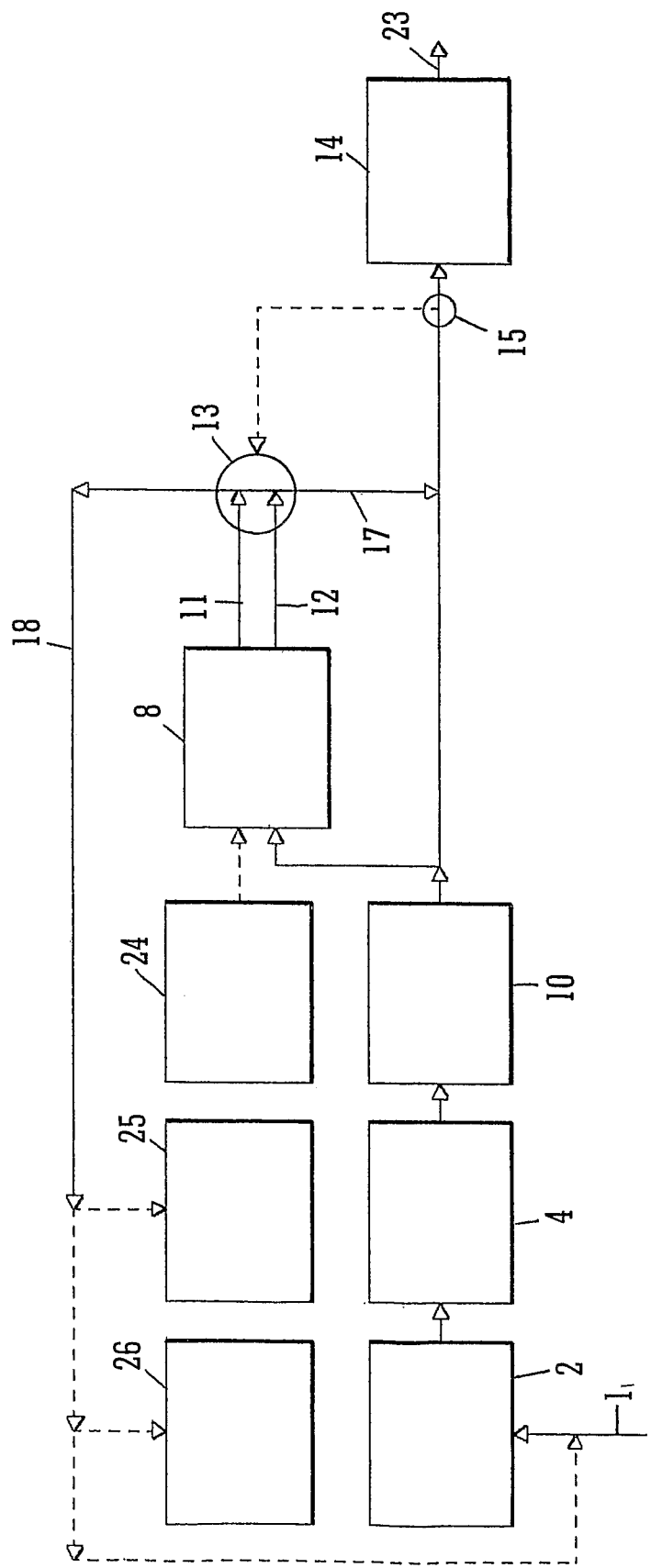

(51) Int. Cl.
    *C02F 1/36*      (2006.01)
    *C02F 103/00*    (2006.01)

(56) References Cited

U.S. PATENT DOCUMENTS

| | | | |
|---|---|---|---|
| 4,259,360 A | | 3/1981 | Venetucci et al. |
| 4,497,664 A | * | 2/1985 | Verry .................. 134/22.12 |
| 4,612,021 A | | 9/1986 | Bland et al. |
| 4,931,225 A | | 6/1990 | Cheng |
| 4,944,602 A | | 7/1990 | Buschelberger |
| 4,969,983 A | | 11/1990 | Parsi |
| 5,049,400 A | | 9/1991 | Hayden |
| 5,137,580 A | | 8/1992 | Honda |
| 5,190,670 A | | 3/1993 | Stearns |
| 5,476,595 A | | 12/1995 | Baddour et al. |
| 5,656,155 A | | 8/1997 | Norcross et al. |
| 5,736,023 A | | 4/1998 | Gallagher et al. |
| 5,816,181 A | | 10/1998 | Sherman, Jr. |
| 5,893,233 A | | 4/1999 | Kaster et al. |
| 5,932,112 A | | 8/1999 | Browning, Jr. |
| 6,126,842 A | | 10/2000 | Decker |
| 6,193,893 B1 | | 2/2001 | Mazzei et al. |
| 6,200,486 B1 | | 3/2001 | Chahine et al. |
| 6,505,648 B1 | | 1/2003 | Gergely et al. |
| 7,244,348 B2 | | 7/2007 | Fernandez et al. |
| 2003/0205135 A1 | | 11/2003 | McNulty |
| 2003/0205136 A1 | | 11/2003 | McNulty |
| 2004/0055966 A1 | | 3/2004 | Nguyen et al. |
| 2008/0000775 A1 | | 1/2008 | Childers, II et al. |
| 2008/0149485 A1 | | 6/2008 | Childers, II et al. |

FOREIGN PATENT DOCUMENTS

| | | | |
|---|---|---|---|
| DE | 38 18 237 A1 | 11/1989 | |
| DE | 4222074 C1 | 11/1993 | |
| EP | 0 323 646 A2 | 7/1989 | |
| EP | 1 717 205 A1 | 11/2006 | |
| FR | 2 809 385 A | 11/2001 | |
| GB | 2 273 926 A | 7/1994 | |
| GB | 2402669 A | 12/2004 | |
| JP | 55 006452 A | 1/1980 | |
| JP | 55 059805 A | 5/1980 | |
| JP | 63 303078 A | 12/1988 | |
| JP | 5200388 A | 8/1993 | |
| JP | 08150992 A | 6/1996 | |
| JP | 10230247 A | 9/1998 | |
| JP | 2001000974 A | 1/2001 | |
| JP | 2002234487 A | 8/2002 | |
| JP | 2003-200156 A | 7/2003 | |
| JP | 2005-131613 A | 5/2005 | |
| JP | 2005246198 A | 9/2005 | |
| RU | 2 049 072 C1 | 11/1995 | |
| RU | 2049072 C1 * | 11/1995 | ................ C02F 1/34 |
| WO | WO 91/01367 A1 | 2/1991 | |
| WO | WO 98/46723 A1 | 10/1998 | |
| WO | 00 00433 A | 1/2000 | |
| WO | 01/36339 A1 | 5/2001 | |
| WO | WO 03/093176 A2 | 11/2003 | |
| WO | 2004112943 A1 | 12/2004 | |
| WO | 2005061388 A1 | 7/2005 | |
| WO | 2005/108301 A1 | 11/2005 | |
| WO | 2006086073 A2 | 8/2006 | |
| WO | 2007049139 A2 | 5/2007 | |

OTHER PUBLICATIONS

Reahl, E.R., "Half a Century of Desalination With Electrodialysis," GE Water & Process Technologies 2006, pp. 1-5, XP-002564579, retrieved from the Internet: URL: http://www.gewater.com/pdf/Technical%20Papers_Cust/Americas/English/TP1038EN.pdf>.
Communication from European Patent Office regarding extended European search report dated Apr. 6, 2010, Ref.:12.91654/14, Application No./Patent No. 09010326.8-1213 / 2112124, Applicant: OceanSaver AS, 5 pages.
Copending U.S. Appl. No. 12/551,870, filed Sep. 1, 2009, Inventor: Aage Bjorn Andersen, Confirmation No. 3458.
Copending U.S. Appl. No. 11/596,179, filed Nov. 26, 2007, Inventor: Gunnar Baerheim, Confirmation No. 7239.
Bizer, J. R., "Project Level Integration for Mainstreaming Aquatic Biodiversity", Oct. 10, 1997, pp. 1-10.
Boylston, J. W., "Ballast Water Management for the Control of Nonindigenous Species," SNAME Transactions, 1996, pp. 391-417, vol. 104.
Hallegraeff G. M., "Transport of toxic dinoflagellates via ships' ballast water: bioeconomic risk assessment and efficacy of possible ballast water management strategies", Marine Ecology Progress Series, 1998, pp. 297-309, vol. 168.
Hoggan, J., et al. "A Simple Production System for the Deoxygenation of Water," SNAME Transactions, 1996, pp. 245-258, vol. 104.
United Kingdom Search Report, dated Aug. 10, 2004.
International Search Report, dated Aug. 26, 2005.
McMahon, et al., Effects of Elevated Carbon Dioxide Concentrations on Survivorship in Zebra Mussels (*Dreissena polymorpha*) and Asian Clams (*Corbicula fluminea*), Feb. 1995, abstract.
McMahon, R.F., et al., Effects of Elevated Carbon Dioxide Concentrations on Survivorship in Zebra Mussels (*Dreissena polymorpha*) and Asian Clams (*Corbicula fluminea*), Center for Biological Macro fouling Research, 1995, pp. 319-336.
Tamburri, M.N., et al., "Ballast water deoxygenation can prevent aquatic introductions while reducing ship corrosion," Biological Conservation, Jun. 15, 2001, 103(2002), pp. 331-341.
UK Search Report, Ref. No. 31.12,91654, Application No. G130620942.3, dated Feb. 8, 2007, 4 pages.
Nature (Chinese Nature), "Studies on the treatment of alien invading organisms by using hydroxyl radicals," vol. 24, No. 4, pp. 223-227 (Aug. 2002).

* cited by examiner

LIQUID TREATMENT METHODS AND APPARATUS

CROSS-REFERENCE TO RELATED APPLICATION

The present application is a national stage filing under 35 U.S.C. §371 of PCT/GB2007/003903, filed Oct. 12, 2007, which in turn claims priority to GB 0703598.3, filed Feb. 23, 2007 and to GB 0620942.3, filed Oct. 20, 2006, all of which applications are hereby incorporated by reference in their entireties.

The present invention relates to the treatment of liquids, such as water, in order to remove unwanted matter.

There are many situations in which the treatment of liquids is required, for example treatment of sewage water and potable water, treatment and processing of hydrocarbon liquids to break down undesirable long chain molecules, treatment of waste water from exhaust gas cleaners. More specific water treatments are also used, such as treating ballast tank water in ships as discussed below, and treating water to be used in fish farming and the like. These latter uses require the break down of unwanted matter in the form of organic matter, micro-organisms and the like, generally in order to kill or disable them so that the treated water does not have undesirable effects in the environment into which it is released, or the environment in which it is put to use.

Ballast water is water transported by ships in the ballast water tanks or sometimes in other suitable spaces such as in cargo holds or in cargo tanks. It is pumped into the tanks at a water "donor" location to compensate for the changing of point of gravity as cargo and/or fuel is discharged/consumed and hence to maintain stability. Correct ballasting is essential from a structural point of view and also used for performance reasons in order to ensure proper propeller and rudder immersion, proper bridge view as well as maintaining desired vessel movement and handling characteristics. The ballast water is transported to a water "recipient" location, generally at a point where the vessel is to be loaded with cargo, which is potentially outside the bio-geographic region of that of the ballast water origin. It may then be discharged as cargo is taken onboard. Ballast water may host a range of species including zooplankton, phytoplankton and bacteria. These may not have natural predators at the point of discharge and may establish and reproduce at the new location causing significant problems for the environment, industry and human health.

In addition, corrosion in the ballast water tanks is caused due to the reaction of the ballast water and oxygen with the material from which the ballast water tanks are built. Currently, the application of expensive paints and coatings are used to prevent corrosion, representing a significant maintenance cost to the shipping industry.

It is known to treat water to clean it by the use of cavitation produced by ultrasonic excitation. For example, U.S. Pat. No. 5,137,580 discloses a cleaning method which uses low and high frequency ultrasonic waves to form and grow cavitation bubbles. This treatment is carried out in static tanks, which means that a continuous treatment process is not possible and instead the tanks must be emptied and re-filled between treatments. As a consequence the treatment process is complicated and inefficient.

As well as the disadvantages of the use of a static tank, ultrasonic cavitation is less effective than other cavitation production methods, in particular hydrodynamic cavitation. This is because the bubble size and cloud density are not as large in cavitation generated by means of ultrasonic exposure compared to the bubble size and cloud density of hydrodynamic cavitation. Thus, hydrodynamic cavitation possesses a higher effective reaction volume compared to ultrasonic cavitation.

The use of venturi type constrictions to generate hydrodynamic cavitation is known, for example from U.S. Pat. No. 6,505,648. This document discloses a passageway for liquid flow with a reduced diameter portion forming a restriction which accelerates the flow of liquid and reduces the pressure to initiate cavitation in order to destroy contaminating organisms. A wire or rod across the restriction can be used to promote turbulence and further reduce the pressure. Downstream of the restriction the passageway widens abruptly leading to collapsing of the cavitation bubbles.

However, this arrangement has been found to be ineffective, as not all organisms in the liquid are affected by the collapsing cavitation bubbles, and as a consequence the water treatment process of the prior art does not treat all parts of the liquid.

Viewed from a first aspect the invention provides an apparatus for the treatment of liquid, the apparatus comprising a cavitation unit, wherein the cavitation unit generates cavitation in the liquid by flow of the liquid into a constriction where cavitation bubbles are formed and then to an outlet where cavitation bubbles implode, and wherein the constriction includes an aperture that is elongate along a line normal to the flow direction.

By elongate it is meant that the aperture is narrow in a direction across the line and is long in the direction along the line. In particular an aperture which is as long as possible is used, and which has a width of 5 mm or less, more preferably 1-2 mm as discussed below. The line may be a straight or a curved line. In preferred embodiments the aperture is an elongate slot or a narrow annulus as discussed below.

The use of an elongate narrow constriction allows cavitation to occur on the whole of the cross-section of the flow of liquid. This is because cavitation tends to initiate at an edge region of the constriction, and with a long narrow aperture the greatest distance of any point in the flow path from the edge region is small. In contrast to the arrangement of the invention, a tubular constriction as in the prior art results in cavitation that is concentrated about the edges of the tubular flow path and thus is applied ineffectively and may not affect the whole of the fluid flow path. This is because unwanted matter in the fluid flow concentrates in the centre of the tubular flow path, and hence is in the region of least cavitation. In the present invention, by having a greater ratio of edge length to flow volume the amount of cavitation compared to the cross-sectional area of the aperture is increased, and the problem of unwanted matter flowing in a region of low cavitation is removed. The aperture could thus be alternatively defined as an aperture having a cross-section with a large edge length in comparison to the enclosed area.

The aperture may be an elongate slot following a straight line but can be any other elongate shape, such as an elongate aperture following a zig-zag line or a curved line. The elongate aperture may follow a line forming a close shape such as a square, circle or ellipse or so on. Preferably the aperture is a narrow annulus, i.e. an elongate aperture following a circular line. The use of an annulus is preferred as this can be readily implemented in a pipe which has a circular cross-section, although as an alternative an oval or other shaped narrow slot could be used. It is beneficial for smooth flow of liquid for corners to be avoided.

The aperture may have a width of less than 5 mm more preferably less than 3 mm and in particular around 1 to 2 mm. The aperture is preferably as long as possible along the line normal to the flow direction, and may be for example at least 300 mm long where a width of 2 mm is used.

Where the aperture is an annulus a width as above and a diameter of 50 to 100 mm may be used. This has been found to provide effective cavitation for a pipe of that size, particularly when treating water to break down micro-organisms having a size of 10-50 μm, as a 1 to 2 mm slot ensures that organisms of this size are generally within a distance of one bubble radius from collapsing bubbles as discussed above. The presence of organisms of this size in ballast water is restricted by law.

Preferably the cavitation unit is arranged to treat the liquid by using cavitation to break down unwanted matter. Formation and implosion of the cavitation bubbles generates forces, temperature changes, and shockwaves which affect unwanted matter in the liquid. This unwanted matter may be organic or inorganic waste, for example in waste water or in water to be treated in the production of potable water. The unwanted inorganic matter may be long chain hydrocarbon molecules. In one preferred embodiment the long chain molecules are in waste water on ships in oils or sludge or other hydrocarbon contaminants.

In a preferred embodiment the unwanted matter consists of water-borne organisms, or micro-organisms. As discussed above, unwanted micro-organisms are present in ballast water used in ships and therefore in a preferred embodiment the cavitation is used to treat ballast water to break down such micro-organisms.

Preferably the cavitation unit is arranged such that at the point where the implosion of the bubbles begins the maximum distance from the edge of bubble to the unwanted matter is less than the radius of the bubble. This can be achieved by selecting the width of the aperture in relation to the size of the unwanted matter. The implosion of bubbles is particularly effective when it occurs in close proximity, and a distance of less than the radius of the bubbles has been found to be effective to ensure that unwanted matter, in particular micro-organisms, is broken down by the cavitation effect.

An annular aperture may be created by a cavitation body in a pipe, in particular a generally cylindrical obstruction in the pipe. Thus, the annulus is defined by the outer wall of the cavitation body and the inner wall of the pipe. The cavitation body may have a rounded end at the inlet to the constriction, for example a section of a sphere. The use of a rounded end to channel the liquid into the constriction is effective in providing the pressure decrease and flow velocity increase required to create cavitation. At the outlet end the cavitation body may have a tapered profile. This aids in increasing the pressure and decreasing the flow velocity to promote implosion of cavitation bubbles whilst minimising energy loss.

A wall of the aperture may have a non-uniform surface or roughened surface. The wall could be the pipe wall or the wall of the cavitation body or both. Preferably the cavitation body has the non-uniform or roughened surface. This arrangement is easier to construct and allows a standard pipe to be used without modification to the inner pipe surface. The surface may be knurled, or a pattern of depressions or dimples may be used. The use of an irregular surface promotes the cavitation effect.

The cavitation unit may comprise a plurality of constrictions such that the formation and implosion of bubbles is repeated. For example an annular aperture having an undulating profile along the flow direction may be used, such as a wave-shaped or saw-toothed profile. This may be achieved by using a cavitation body having an undulating outer surface, which can be inserted into a standard cylindrical pipe.

Where the apparatus is used for the treatment of ballast water, or for any other use where a tank is filled or emptied a varying back pressure is applied by the tank to the apparatus. The effectiveness of the cavitation unit will be improved when the back pressure is maintained above a minimum level. Therefore, a pressure modification device is preferably used to maintain the pressure to the cavitation unit at acceptable levels. For example a minimum back pressure of 1.5 bar or 2.5 bar may be maintained, or a back pressure in the range of 2 to 2.5 bar may be maintained.

To ensure that all of the liquid to be treated is subject to the effect of cavitation, the distance between the walls of the aperture is limited by the size of the unwanted matter to be broken down. Too large an aperture will not be effective, as the imploding cavitation bubbles will not be close enough to the unwanted matter. As a result, the size of the cavitation unit and hence the maximum volume of water per unit time which can be treated is limited. Therefore, in a preferred embodiment, the apparatus includes a plurality of cavitation units in an array such that liquid can flow in parallel through a number of cavitation units. The cavitation units may be of different sizes. In one preferred embodiment the array comprises a large central support surrounded by a ring of cavitation units. The cavitation units may be smaller than the central support. The large central support may be the same shape as the cavitation units. The large central support may act as an additional cavitation unit. In another preferred embodiment many cavitation units of the same size in concentric rings are used.

The use of an array of cavitation units allows large flow volumes to be treated without compromising on the effectiveness of the cavitation treatment. The apparatus may also include a manifold for channelling liquid equally to each cavitation unit to achieve the same flow rate in each unit.

The apparatus may include a hydrophone that monitors cavitation to obtain cavitation data, wherein the cavitation data is used to control system parameters of the cavitation unit. The hydrophone detects the pressure pulses caused by the cavitation unit, and the cavitation data may be used to control parameters such as flow rate and pressure in order to optimise the operation of the cavitation unit.

The apparatus may include an electrical treatment unit for treating the liquid prior to or following flowing it through the cavitation unit in order to weaken or damage the unwanted matter in the liquid. The electrical treatment unit may apply an electro-chemical effect, ionisation, a physical effect or any combination of the three. A water treatment apparatus including an electrodialysis cell, which is believed to be inventive in its own right, is discussed below and may be used in combination with or as part of the water treatment apparatus described above.

The apparatus may include a gas injection unit, in preferred embodiments the injection unit is for the injection of nitrogen or oxygen containing gas into water. The oxygen containing gas may be air. Injection of nitrogen reduces the amount of oxygen in the water and can therefore act to reduce corrosion and also to reduce weathering of corrosion protection systems such as coatings and paints as oxidation is a cause of such weathering. This is useful when water is taken in to a ballast tank, as otherwise oxygen in the stored water can lead to corrosion or weathering of coatings. The tank could, for example, have a PU one layer coating or other one layer coating, but the water treatment is also advantageous when other coatings are used.

When the water is returned to the environment, for example when emptying a ballast tank, a gas mixture including oxygen, which may be air for example, may be used to return oxygen to the water to avoid any detrimental environmental impact. The gas injection unit may be a nozzle within a flow path of the liquid, and a static mixer may be placed downstream of the nozzle. Alternatively, the gas injection unit may incorporate combined gas and steam injection as discussed below in relation to a water treatment apparatus including an injection unit, which is believed to be inventive in its own right.

Preferably, nitrogen gas is introduced into the water by separating a part of the water flow from the main flow, supersaturating this part of the water flow, and returning the supersaturated water to the main part of the water flow. The amount of water separated from the main flow may be between 5%-30% by volume, preferably less than 15% by volume. Due to the large amount of gas injected into a small volume, the flow following gas injection may be characterised as a two-phase flow. In order to improve mixing of the gas into the water, static mixer may be used in separated water flow downstream of the point of gas injection. At the point of re-injection into the main flow, a static mixer may be applied to facilitate mixing of the two-phase flow back into the main flow.

Viewed from a second aspect the invention provides a method of treating liquid, the method comprising passing the liquid through a cavitation unit, generating cavitation by flowing the liquid into a constriction in which cavitation bubbles are formed and then to an outlet where cavitation bubbles implode, wherein the constriction is provided by an aperture that is elongate along a line normal to the flow direction.

In preferred embodiments the method of the second aspect of the invention includes method features corresponding to the preferred apparatus features discussed above.

It is also known to treat water by applying an electrical field. The use of an electrical field relies on a certain level of conductivity of the water, which could be provided by impurities in the case of 'fresh' water, or is provided by salts in sea water. In the case of electrochemical treatments, the presence of ions in the water that will respond when exposed to an electrical current is also required, and once again these are provided by impurities and salts in the water. In the field of ballast water treatment, CN 1736798 utilises an electrolytic treatment tank to generate oxidants and free radicals, and to kill or deactivate organisms using the force of the electric field. The entirety of the ballast water is treated by the electrolytic tank.

Electrodialysis is a known fluid treatment process which may be applied to treat water for different purposes. The principle of the process is that of ion-separation by applying an electric potential difference, either constant or in pulses, between two electrodes separated by a membrane, which may be ion-selective. One electrode will perform as an anode (positive charge) attracting negatively charged ions whilst the other will perform as a cathode (negative charge) attracting positive charged ions. The fluid in the compartment between the membrane and the anode will become characterised by negatively charged ions with an excess of electrons and may be referred to as the concentrate while the fluid in the compartment between the membrane and the cathode will be characterised by the presence of positive ions with a shortage of electrons and may be referred to as the diluate. This configuration is known as an electrodialysis cell.

In most practical electrodialysis processes, multiple electrodialysis cells are arranged into a configuration called an electrodialysis stack, with alternating anion and cation exchange membranes forming the multiple electrodialysis cells, generally between a single anode and cathode. The main known uses of electrodialysis are large scale brackish and sea water desalination and salt production, and small and medium scale drinking water production. The process is also used in the process industry for separation of certain contaminants such as heavy metals.

Electrodialysis systems can be operated as continuous production or batch production processes. In a continuous process, diluate and/or concentrate is passed through a sufficient number of stacks placed in series to produce the final desired product quality. In batch processes, the diluate and/or concentrate streams may be recirculated and/or cross-treated through the electrodialysis systems until the final product or concentrate quality is achieved. In each case, the entirety of the final product or products is treated using the electrodialysis cell, either in the diluate stream or in the concentrate stream.

U.S. Pat. No. 5,540,819 discloses an electrodialysis type cell for preparing drinkable water from fresh water polluted with pathogenic micro-organisms. The cell is divided by a permeable membrane into two compartments containing an anode and a cathode respectively. Direct current is passed through the water between the anode and the cathode, and the water flows first through the anode compartment and then through the cathode compartment. All of the water to be treated is passed through the anode and then the cathode in sequence.

Viewed from a third aspect, the present invention provides a water treatment apparatus comprising: an electrodialysis cell; an inlet flow path for directing only part of a quantity of water to be treated through the electrodialysis cell, and an outlet flow path for returning a product of the electrodialysis cell to the remainder of the water.

By returning water treated by the electrodialysis cell to the main water flow, all of the water downstream of the electrodialysis cell or downstream of the point of the outlet flow path will become affected by its characteristics without the need to expose all of the water to the electrical treatment. The product of the electrodialysis cell has the effect of disabling or killing micro-organisms, and can also have a beneficial effect on treating organic compounds in the water. The inventors have found that by directing only a part of the water through the electrodialysis treatment cell and returning a product of the electrodialysis cell to the water, an effective water treatment is achieved without the need to treat the entire water flow with the electrodialysis cell. Thus, in the present invention only a small amount of water needs to be exposed to the electrodialysis treatment, rather than treating all of the water with electrodialysis as in the prior art systems discussed above. This reduces the amount of electrical power required to carry out the water treatment. In addition, the treatment apparatus can be smaller compared to the prior art water treatment systems due to the comparatively smaller volume of water treated by the electrodialysis cell in order to obtain an overall treatment effect on the whole volume of water. Any effect on the flow rate of the main water flow is also kept to a minimum.

The part of the water treated by the electrodialysis cell is preferably separated from the incoming water flow just prior to treatment and then passed through the electrodialysis cell as the remainder of the water passes by without being treated by the electrodialysis cell. Thus, the apparatus may include a main flow path, wherein the inlet flow path is arranged to separate a portion of the flow from the main flow path and direct it through the electrodialysis cell. The apparatus may include a connection from the outlet flow path to a main flow path, wherein the outlet flow path introduces the product of the electrodialysis cell to the main flow path.

The water which is not treated by the electrodialysis cell can be exposed to other treatments, which may be in parallel with the electrodialysis treatment, for example a cavitation treatment or a nitrogen injection treatment as discussed in more detail below.

Preferably less than 5% by volume of the total water flow into the treatment apparatus passes through the electrodialysis cell, more preferably less than 1% and yet more preferably less than 0.5%. An amount of about 0.2% by volume is preferred, and depending on conditions, amounts as low as 0.05% or 0.01% could be used. It is possible to manipulate the necessary flow volume by altering the current used in the electrodialysis cell and the salinity of the water. Thus, depending on these factors and the particular application of the treatment, the flow volume used can be larger or smaller.

In preferred embodiments, the invention is a ballast water treatment apparatus. As discussed above, water treatment of this type is particularly desirable for ballast water. Many existing water treatments are not suitable for ballast water treatment due to the high volume of water that needs to be treated in a short space of time. As only a part of the water needs to be passed through the electrodialysis cell, with the remainder of the water not passing through the cell, the treatment can be applied to a much higher volume of water in a given time than alternatives which require the entirety of the water to be directly affected by an electrical treatment.

The electrodialysis cell may be for producing a diluate stream and a concentrate stream, with the product of the electrodialysis cell that is returned to the water being composed of some or all of one or both of these streams. The product of the electrodialysis cell may simply be the concentrate stream produced by the electrodialysis cell. However, preferably the product of the electrodialysis cell is a mixture of the concentrate stream with at least a portion of the diluate stream. The concentrate stream contains an increased content of different oxidants and the oxidants are particularly effective at killing or disabling micro-organisms in the water when the product of the electrodialysis cell is returned to the main water flow.

After the electrodialysis treatment, the concentrate may have a lower pH than the water prior to treatment, and the diluate may have a higher pH. Mixing the concentrate with some or all of the diluate therefore allows the pH of the product of the electrodialysis cell to be adjusted.

One or both of the concentrate stream and the diluate stream may be produced by cross-treatment or recirculation. Cross-treatment, meaning sequential treatment (one sequence, two sequences or more) where the flow (from one compartment or from both compartments) between the membranes in the electrodialysis cell is recirculated through the opposite compartment separated by the membrane of the cell, may be applied to alter the characteristics of the concentrate and diluate and/or to reduce the quantity of the diluate and/or to simplify the final mixing of the two streams before re-injection to the main flow. Similarly the flow from the same compartments may be recirculated in order to alter the characteristics of the concentrate and the diluate before final mixing and re-injection to the main flow.

In a preferred embodiment the concentrate stream and at least a portion of the diluate stream are mixed immediately after passing through the electrodialysis cell. This may be done by removing a portion of the diluate stream, and then mixing the remainder of the diluate with the concentrate stream. The amount of diluate removed may be between 40% and 60% by volume.

In order to control the mixing ratio to keep the pH of the concentrate or mixed concentrate and diluate in a desired range the concentrate, diluate and/or mixed pH is monitored. The pH monitoring may be by means of a pH electrode. The product of the electrodialysis preferably has a pH of 1-5, more preferably a pH of about 3. A result of this is that the pH of the main flow, after the product of the electrodialysis cell is added, is maintained within a range from 7.0 to 8.5, which is similar to sea water pH. The pH of the product of the electrodialysis cell may be controlled by varying the amount of diluate added to the concentrate, for example by varying the amount of diluate removed prior to mixing. The pH of the concentrate is generally lower that the desired pH, and mixing with some of the high pH diluate may hence be used to increase the pH of the product of the electrodialysis cell. Control of the pH may also occur by controlling the current or voltage supplied to the electrodialysis cell, to thereby vary the strength of the resultant electrodialytic effect and hence vary the oxidative strength of the concentrate.

The apparatus may include a diluate removal flow path for removing a part of the diluate stream. To facilitate mixing of the concentrate and non-removed diluate the apparatus may include a mixing area prior to the outlet flow path. In one preferred embodiment, the mixing area is a buffer tank. Alternatively, the concentrate and diluate may be mixed as they flow through the outlet flow path. Mixing may occur at the same time as the concentrate stream and non-removed part of the diluate stream are mixed with the main flow, i.e. the product of the electrodialysis cell may consist of two parts which are only mixed when these two parts are mixed with the rest of the water. In another alternative preferred embodiment, mixing is carried out within the bypass flow, for example with a static mixer or other mixing arrangement, and the flow is then reinjected after cavitation where the system pressure is lower due to the pressure drop over the cavitation unit. This arrangement avoids the need for a mixing tank or a dosage pump and also provide an opportunity to control and manage any gas bubbles arriving from the electrodialytic process as discussed in more detail below.

Mixing may be promoted by a static mixer or turbulence inducing means in the mixing area or in the outlet flow path.

The removed diluate may be re-injected to the water upstream prior to the electrodialysis cell. If other treatment stages are included as discussed below, then the remainder of the diluate is preferably re-injected prior to all treatment stages and even prior to filtration and the suction side of the ballast pump if included. Re-injecting the diluate avoids the need to dispose of it, and it will react harmlessly with impurities, unwanted matter and such like in the incoming untreated water. The diluate may advantageously be used as a cleaning agent, in particular for the filtering processes if it is injected prior to filtering, or stored and used directly to clean the filters.

The characteristics and amounts of concentrate and dilute reinjected into the main flow may be controlled by monitoring Oxygen Reduction Potential (ORP) and/or the consumption of Free Available Chlorine (FAC). The ranges for desired values of ORP may be 250-800 mV, more preferably 300-500 mV. The immediate initial values of FAC following reinjection is preferably between 2 and 4 ppm dropping to 0.1-0.4 ppm after a period of 1 hour. The consumption of FAC is strongly dependent upon the characteristics of the water to be treated. To optimise the performance of the electrodialytic cell, it is desirable to arrange a calibration flow loop allowing presetting of current and mixing ratios prior to initiating actual water treatment. When the ORP and/or FAC measured values are outside the desired ranges, then the operation of the electrodialysis cell is adjusted accordingly.

To direct the water flow, the apparatus may comprise conduits, pipes, baffles and the like. The electrodialysis cell may be integrated into a flow path for the main water flow, and thus the apparatus may include a main flow pipe or conduit for the main flow, with smaller pipes or conduits or the like for channelling a part of the main flow through the cell. Alternatively, the electrodialysis cell may be provided as a standalone unit which can be connected to an existing water conduit to treat the water therein. The treatment flow path may be formed by a conduit which is external to the main flow path. This allows an existing water flow path to be easily adapted to include the treatment apparatus by the addition of an appropriate inlet and outlet junction. In this case, the treatment apparatus may include suitable pipes or conduits for connection of the standalone unit to the existing conduit, along with valves, dosage pump(s) and so on as required.

An independent source of brine may be used to augment the input electrolyte for the electrodialysis cell and increase its salinity. This might for example be brine produced as a by-product of freshwater production or in a dedicated brine production plant, such as a reverse osmosis plant. A recirculating reverse osmosis plant may be used to generate a saturated brine solution for use as an addition to the input electrolyte. The addition of brine or the like is required when the system is used to treat fresh water or weakly brackish water, as otherwise the electrical treatment will not be effective due to a lack of ions in the water. Brine may be also added to sea water with a low salt content in order to bring the salt content of the electrolyte to a more preferred level. At lower salt contents a larger electrical current is required to achieve the same treatment effect with the electrodialysis cell. Consequently, by increasing the salt content a reduction in energy usage can be obtained. As an example, in the North Sea a salinity of 25 parts per thousand or higher is typical, whereas in the Baltic Sea surface waters have a much lower salinity, of perhaps 7 parts per thousand. Preferably, brine is added to the input electrolyte to the electrodialysis cell to maintain a salinity of at least 25 parts per thousand.

Preferably, the water is stored for a period of time in a reservoir or tank after treatment. This allows time for the oxidants and reactive substances from the product of the electrodialysis cell to have full effect on any micro-organisms and other unwanted matter in the water. In a particularly preferred embodiment, the invention is used in ship's ballast water treatment, wherein the water is treated as it is taken in to the ballast tanks, and then it is stored in the ballast tanks before discharge. In this circumstance there is generally a reasonable time of storage as the ship moves from port to port before re-loading with cargo and discharging the ballast water. This time can be advantageously put to use in allowing the treatment by the product of the electrodialysis cell to take effect.

In order to allow a large volume of water to be treated, the electrodyalsis is preferably provided by a plurality of electrodialysis cells in parallel, instead of one larger cell. This allows for a more modular construction, and simplifies the construction of each cell by reducing the complexity and size of the parts.

The treatment may include gas injection. In preferred embodiments a gas injection unit is provided for the injection of nitrogen and/or of oxygen containing gas into water. The oxygen containing gas may be air.

Injecting oxygen can be used to return the oxygen content of the water to an appropriate level before the water is discharged from the tank to the environment, for example discharge out of a ballast tank into the sea.

Preferably, the treatment includes a gas injection unit for injecting nitrogen gas into the water. The nitrogenation of the water is thought to prolong the oxidant treatment, and also has a beneficial corrosion reduction effect as discussed above.

Nitrogen may be injected into all or a part of the water flow. The nitrogen is preferably injected in sufficient amounts to ensure that the treated water is super-saturated with nitrogen. In a preferred embodiment, a part of the water flow is separated from the main flow, and nitrogen is injected into this part. Preferably the part of the water flow is less than 15% of the whole volume of water flow. When the nitrogenated water flow is reintroduced to the main water flow, a static mixer may be used to promote mixing of the two water flows.

Turbulence resulting from the gas injection may be used to promote mixing of the product of the electrodialysis cell with the main flow.

The gas injection unit may be a nozzle within a flow path of the water, or a separated part of the water, and a static mixer may be placed downstream of the nozzle. Passing the gas and water mixture through a static mixer promotes nitrogenation of the water.

Alternatively, the gas injection unit may be as discussed below.

In a preferred embodiment, the apparatus includes a cavitation unit. The use of a cavitation unit produces a physical effect on any micro-organisms and other living and non-living matter in the water and thus breaks down these unwanted elements. Preferably, the cavitation unit is placed to treat water before the product of the electrodialysis cell is returned to the treatment flow path. The cavitation treatment can thus be used to eliminate larger and more complex organisms, as well as breaking down other unwanted matter, and in particular breaking down groups or clumps of micro-organisms, with the product of the electrodialysis cell then providing a final level of treatment that eliminates any remaining organisms, and is able to act more effectively due to the fact that larger sized organisms and groups of organisms have been broken down. Turbulence resulting from the cavitation treatment may be used to promote mixing of the product of the electrodialysis cell with the main flow.

The electrodialysis cell may advantageously be placed in parallel with the cavitation unit. In this case, a small amount of the water flow passes through the electrodialysis cell with the main part of the water passing through the cavitation unit. Preferably less than 5% by volume of the total water flow into the treatment apparatus passes through the electrodialysis cell, more preferably less than 1% and yet more preferably less than 0.5%. An amount of about 0.2% by volume is preferred, and depending on conditions, amounts as low as 0.05% or 0.01% could be used. The product of the electrodialysis cell is returned to the main flow after the cavitation unit.

Although this means that a small proportion of the water is not treated by the cavitation unit, the overall efficacy of the treatment is not significantly affected, and an advantage of having the inlet and outlet of the electrodialysis cell either side of the cavitation unit is that the pressure drop over the cavitation unit provides a pressure difference to drive the flow through the electrodialysis cell, avoiding the need for a separate pump and making the system self powering in a closed circuit. There are also added benefits in the resultant use of a pressurised electrodialysis cell, and this minimises or avoids the production of gaseous hydrogen during the electrical treatment. Gaseous hydrogen production is a well know danger of electrolysis of water. With the pressurised electrodialysis cell, although hydrogen may be formed it is always maintained in a safe, dissolved state.

With a pressurised electrodialysis cell, an appropriate membrane should be selected, which allows the process to operate under pressure. Preferably the electrodialysis cells are constructed using a ceramic membrane. Such membranes operate more effectively under pressure than other types of membrane.

The cavitation unit may be a venturi type cavitation unit. In a preferred embodiment, the cavitation unit is a unit as discussed above.

Viewed from a fourth aspect the invention provides a method of treating water, the method comprising: flowing only a part of the water through an electrodialysis cell, and returning a product of the electrodialysis cell to the remainder of the water.

In preferred embodiments the method of the fourth aspect of the invention includes method features corresponding to the preferred apparatus features of the third aspect as discussed above.

In a particularly preferred embodiment the method is for the treatment of ballast water, and the method comprises: treating the water used to fill the ballast tank in accordance with the fourth aspect of the invention, injecting nitrogen into the water, storing the treated water in the ballast tank, discharging the water from the tank and releasing it to the environment.

The method may include generating cavitation in the water as the water enters or is discharged from the tank. Preferably cavitation is used to treat the water before the product of the electrodialysis cell is returned to the water.

In a preferred embodiment, the method includes treating the discharged water by injecting an oxygen containing gas before releasing the water to the environment. The oxygen containing gas may be air.

By treating the water as it enters and leaves the tank the risk of storing and releasing undesirable matter, in particular micro-organisms and other organic matter, is greatly reduced, as the various treatment steps result in such matter being broken down to a non-hazardous state. The injection of nitrogen into water which is then stored reduces corrosion of the ballast tank by reducing the amount of dissolved oxygen in the water. In addition, this reduces weathering of corrosion protection systems such as coatings and paints as oxidation is a cause of such weathering. The injection of air as the water is released ensures that sufficient oxygen is present in the released water to avoid adverse environmental effects from any remaining gas super-saturation.

Viewed from a fifth aspect the invention provides a water treatment apparatus comprising a gas injection unit including an injection nozzle placed within a water flow path, the injection nozzle being small compared to the size of the water flow path, wherein the injection nozzle comprises a steam inlet, a gas inlet, a mixing region for mixing the gas and steam, and an opening into the water flow path.

The use of steam improves the gas/water mixing and can therefore reduce the amount of gas required to achieve the desired effect. In addition, injected steam generates pressure pulses, which can affect organisms present in the water and thus aid in breaking down unwanted organisms. By making the size of the injection nozzle small compared to the water flow path, which may for example be a pipe or the like, the injection nozzle does not obstruct the water flow.

Steam injection may be used to generate a higher speed jet downstream of the injection point. This accelerates the fluid and generates an additional pumping effect within the water treatment apparatus.

Preferably the gas is mixed into the water in a jetting regime, and in a preferred embodiment this is achieved by the amount of injected steam being higher than 150 kg/(m$^2$s).

In a preferred embodiment the steam inlet comprises a nozzle, and the gas inlet comprises a passage about the steam inlet nozzle. The passage may be an annular passage with outer wall of the annular passage formed by a pipe. The mixing part may be a chamber formed by continuation of the pipe beyond the open end of the steam inlet nozzle.

The opening into the water flow path may be simply an outlet nozzle formed by the end of the pipe, but in a preferred embodiment the outlet nozzle includes a diverging profile where the mixture of gas and steam is expanded prior to entering the water flow path. The use of a diverging region avoids the risk of choking of the injected gas and steam.

Viewed from a sixth aspect the invention provides a method of treating water by injecting gas into a water flow path using an injection nozzle placed within a water flow path, the injection nozzle being small compared to the size of the water flow path, wherein gas and steam are supplied from a steam inlet and a gas inlet and the gas and steam are mixed and injected into the water flow path.

Preferred embodiments of method of the sixth aspect may include features corresponding to the preferred features of the apparatus of the fifth aspect as discussed above.

Viewed from a seventh aspect the invention provides a water treatment apparatus comprising an electrical treatment unit for applying electrical current to water and a cavitation unit, wherein water flows in parallel through the electrical treatment unit and the cavitation unit.

By combining electrical treatment and cavitation any organisms and in particular micro-organisms in the water, as well as other types of unwanted matter, can be broken down more effectively. The parallel flow enables the pressure drop over the cavitation unit to drive water through the electrical treatment unit.

In a preferred embodiment the apparatus is for the treatment of ballast water, and is arranged to treat water being moved into or out of a ballast water tank on a ship.

Preferably the apparatus includes a gas injection unit for the injection of gas into the water after the electrical and cavitation treatment. The use of a gas injection unit allows the water to be treated with nitrogen gas or with air in order to reduce or increase the oxygen content as discussed above, and to damage organisms by the effect of gas super-saturation.

Nitrogen may be injected into all or a part of the water flow. The nitrogen is preferably injected in sufficient amounts to ensure that the treated water is super-saturated with nitrogen. In a preferred embodiment, a part of the water flow is separated from the main flow, and nitrogen is injected into this part. Preferably the part of the water flow is less than 15% of the whole volume of water flow. When the nitrogenated water flow is reintroduced to the main water flow, a static mixer may be used to promote mixing of the two water flows.

The apparatus of this aspect may include a first filter before the electrical treatment unit to remove large bodies from the water. A filter may be present after the cavitation treatment to remove smaller bodies from the water, in particular to remove broken down micro-organisms and the like.

In preferred embodiments the cavitation unit is in accordance with the unit described in the first aspect and the preferred features of the first aspect. The electrical treatment unit preferably incorporates the features of the apparatus of the third aspect and its preferred embodiments. Further, the gas injection unit may be in accordance with the fifth aspect and preferred features thereof.

Viewed from an eighth aspect the invention provides a method of water treatment comprising: splitting the water flow into two parts, treating one part with an electrical treatment unit, treating the other part, in parallel, with a cavitation unit, and recombining the two parts.

The method may include injecting gas into the water.

One or more of the electrical treatment, generation of cavitation and gas injection are preferably in accordance with the methods of the fourth, second and sixth aspects of the invention respectively, and may include the preferred features of those aspects as discussed above.

Thus, the electrical treatment may include treatments such as an electrodialysis process, in which electricity is used to generate chemical reactions in the water, and these chemical reactions lead to further water treatment effects in the recombined water when the electrically treated water is recombined with the other part of the water.

Preferably the method is for the treatment of ballast water, and the method comprises: treating the water used to fill the ballast tank as above, with the gas injection unit injecting nitrogen, storing the treated water in the ballast tank, discharging the water from the tank, optionally treating the discharged water by repeating the steps of generating cavitation and/or injecting gas, with the gas injection unit injecting air, and releasing the water to the environment.

By treating the water as it enters and leaves the tank the risk of storing and releasing undesirable matter, in particular micro-organisms and other organic matter, is greatly reduced, as the various treatment steps result in such matter being broken down to a non-hazardous state. The injection of nitrogen into water which is then stored reduces corrosion of the ballast tank by reducing the amount of dissolved oxygen in the water. In addition, this reduces weathering of corrosion protection systems such as coatings and paints as oxidation is a cause of such weathering. The injection of air as the water is released ensures that sufficient oxygen is present in the released water to avoid adverse environmental effects from any remaining gas super-saturation.

The apparatuses and methods of all of the embodiments described above may be for retro-fitting to existing water treatment apparatuses, or to systems in which it is desirable to add a water treatment apparatus.

Figure 1B:
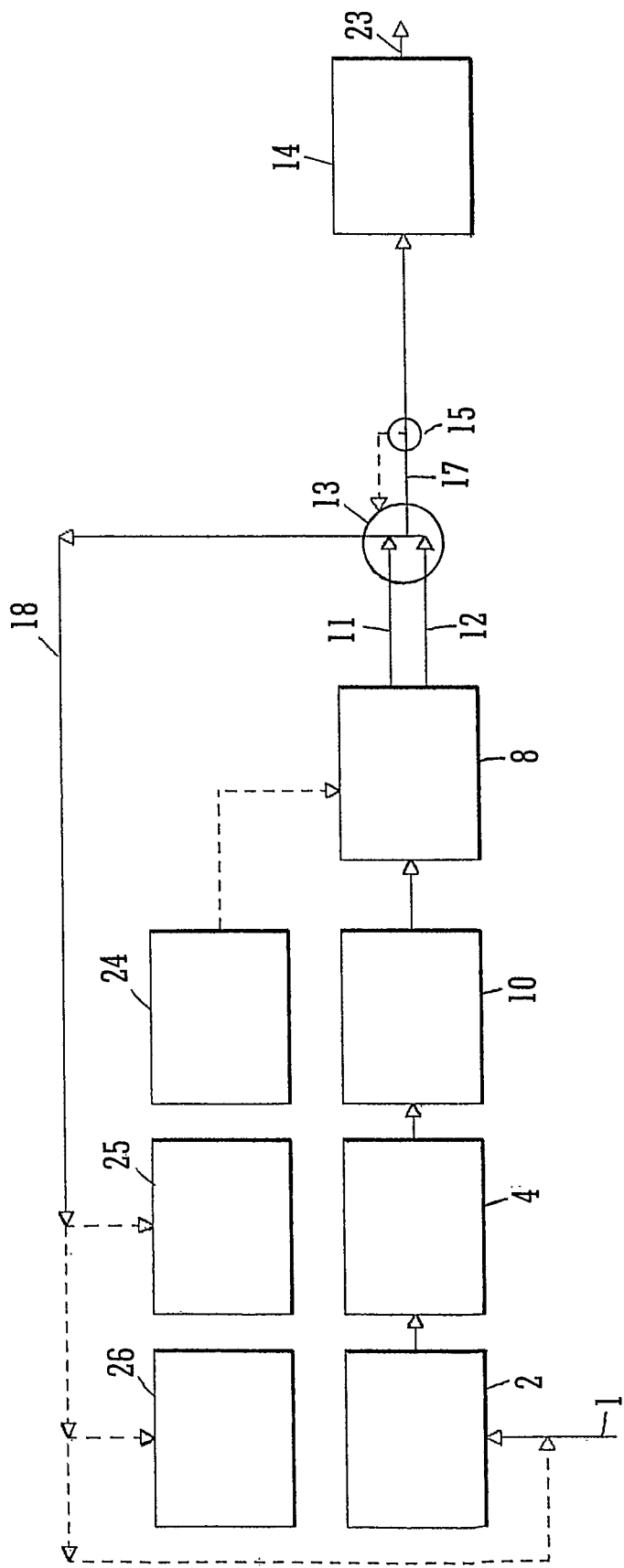
Figure 1C:
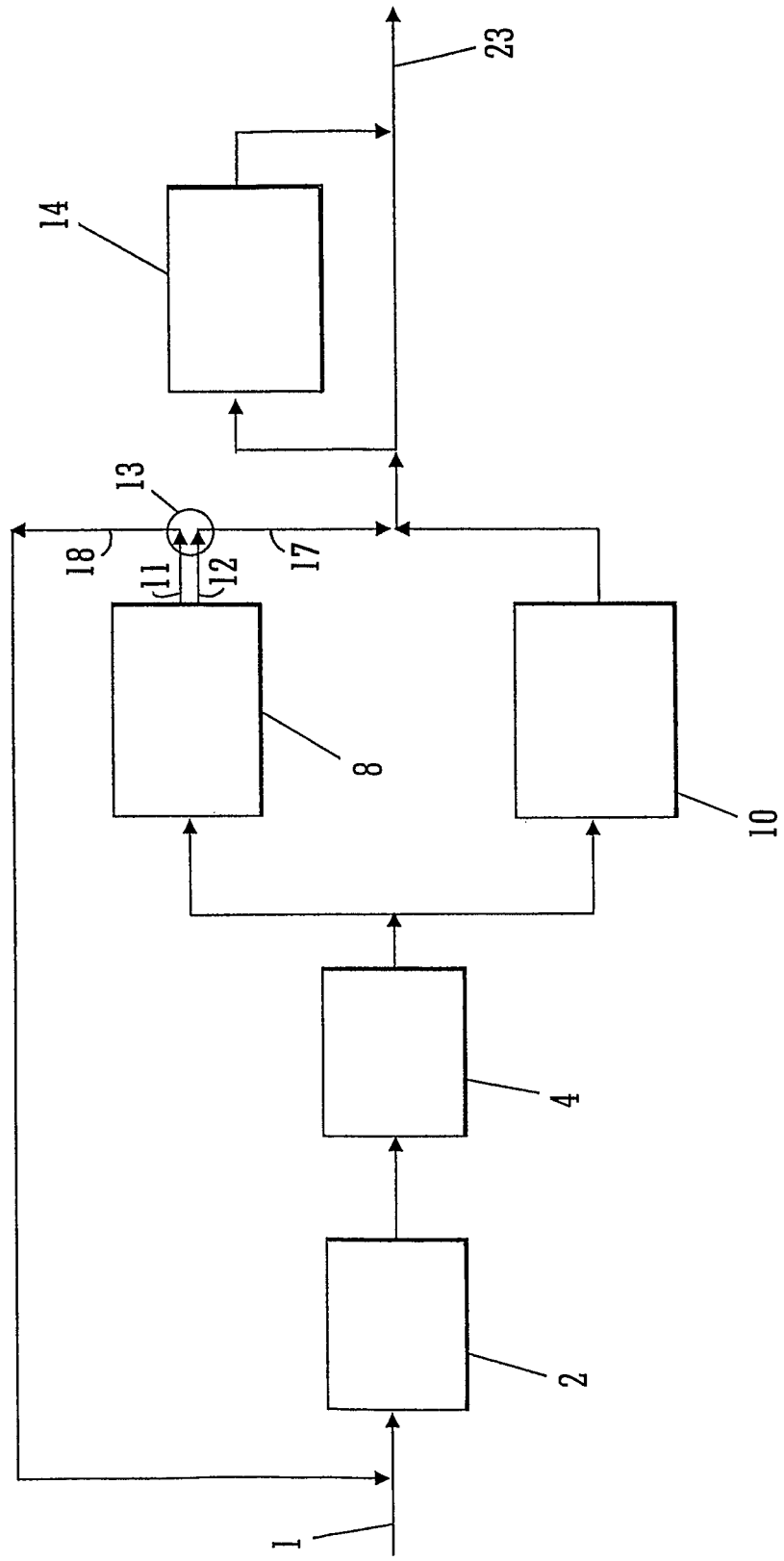
Figure 2:
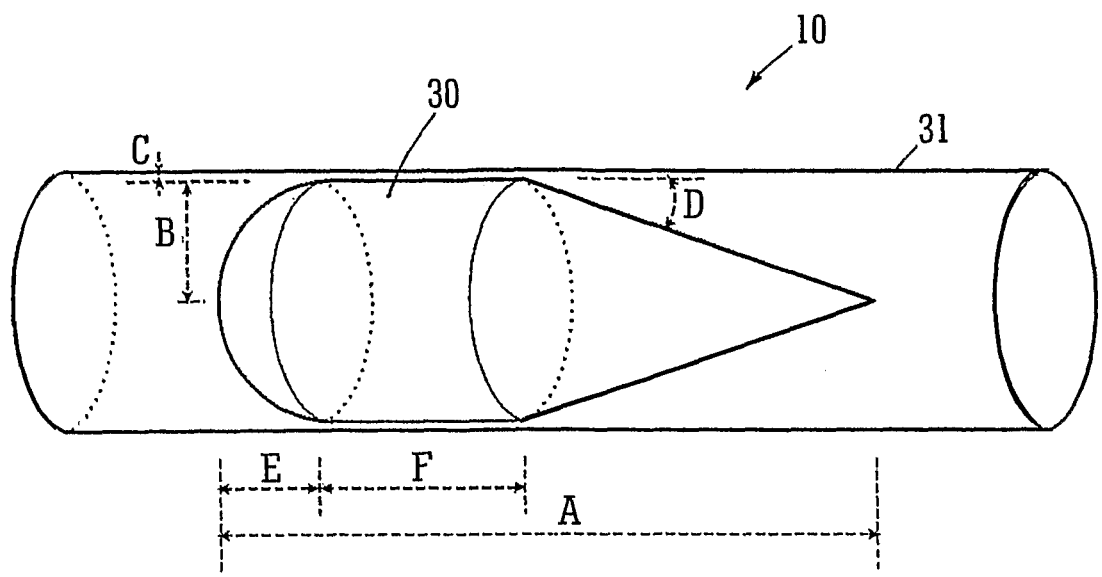
Figure 6:
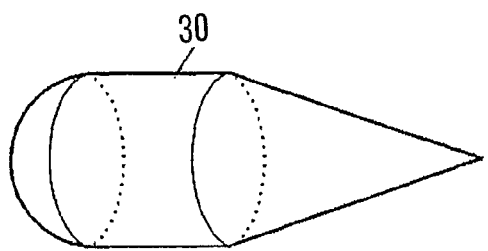
Figure 7:
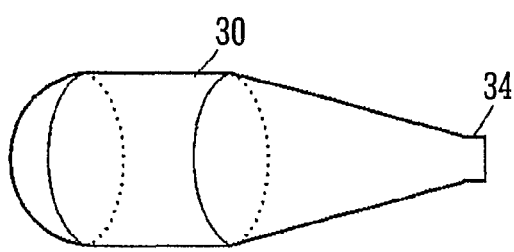
Figure 8:
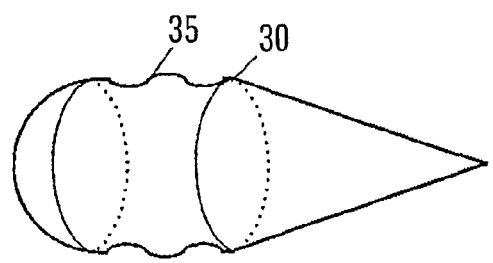
Figure 9:
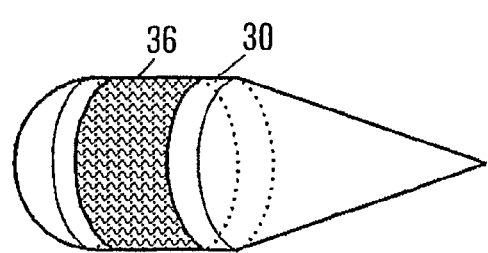
Figure 10:
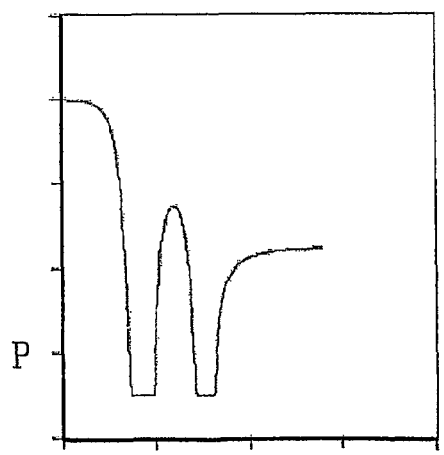
Figure 11:
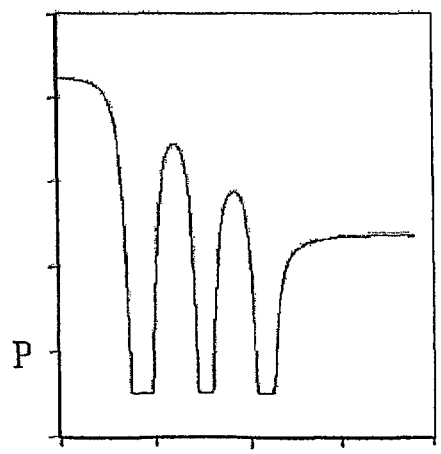
Figure 12:
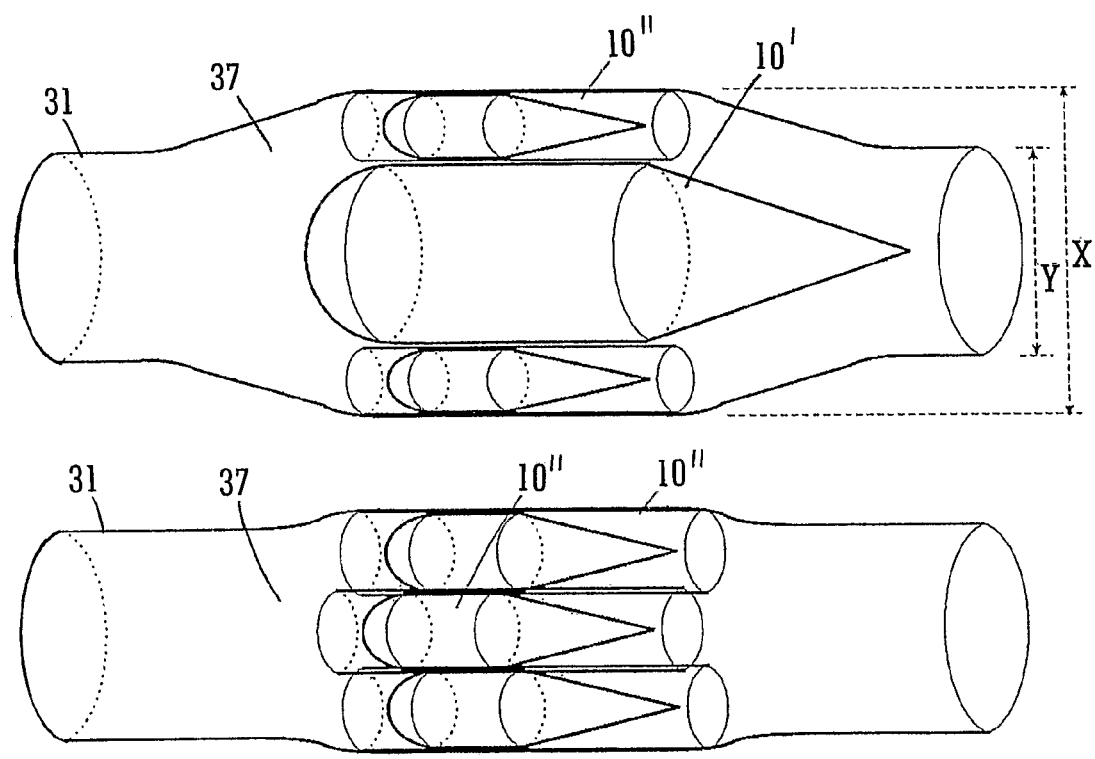
Figure 13:
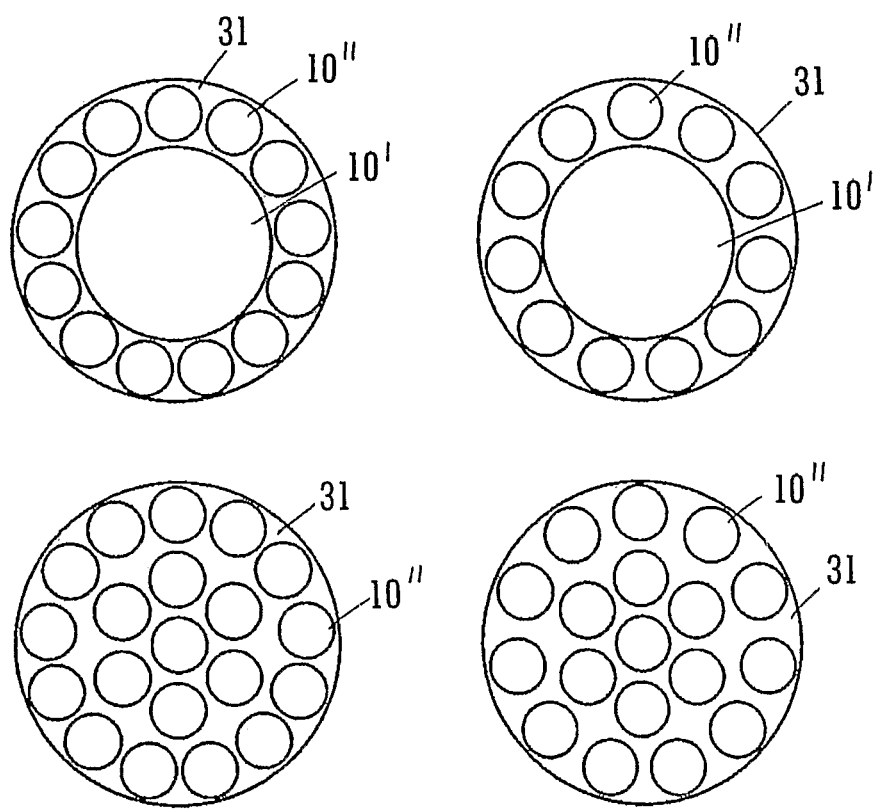
Figure 14:
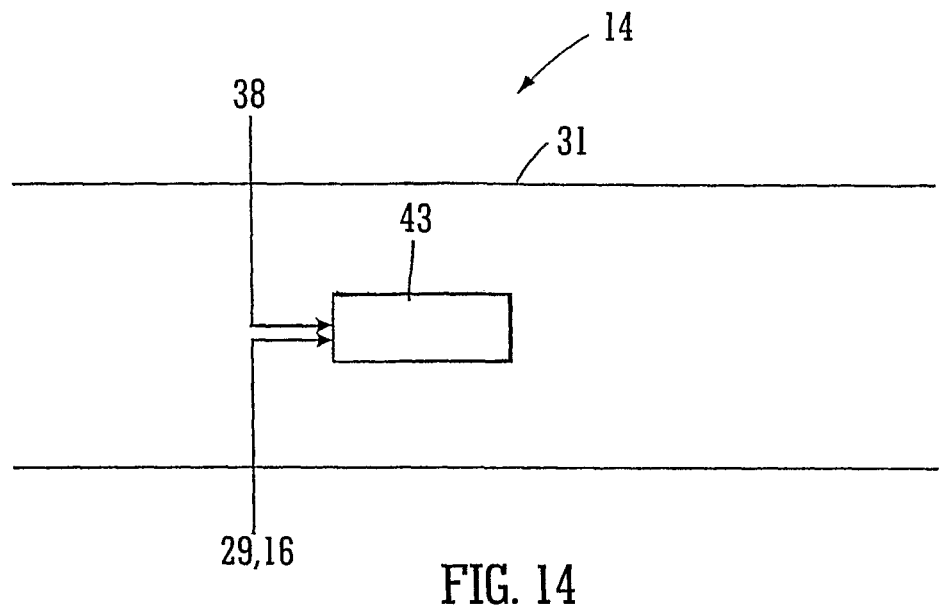
Figure 15:
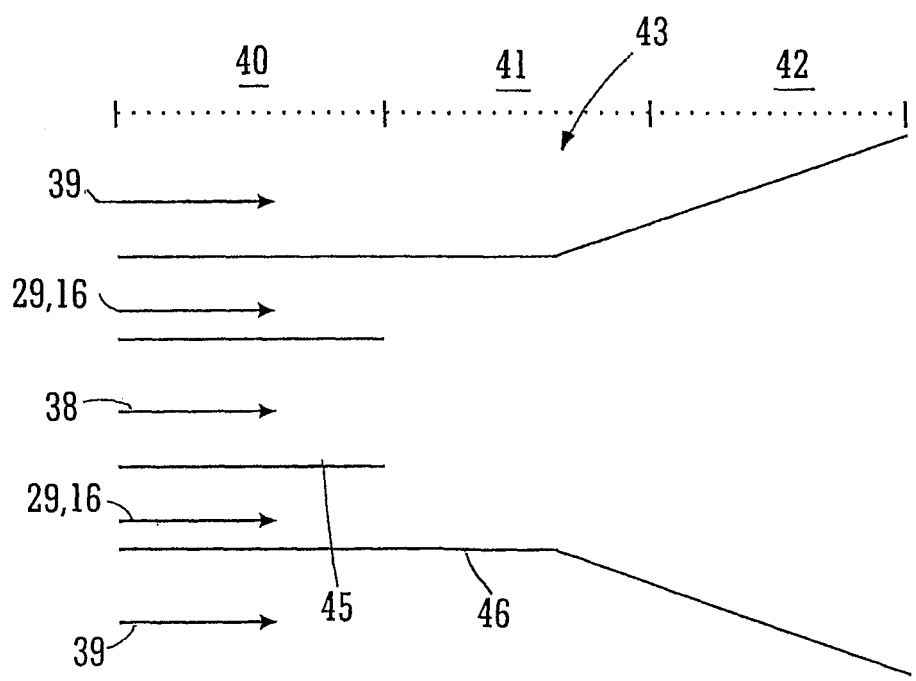
Figure 16:
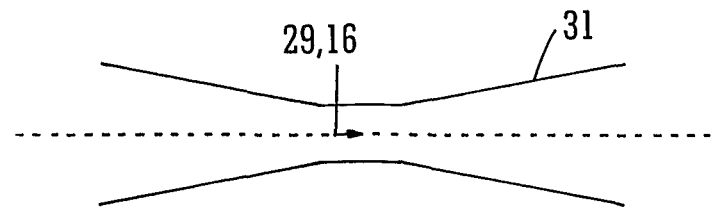
Figure 17:
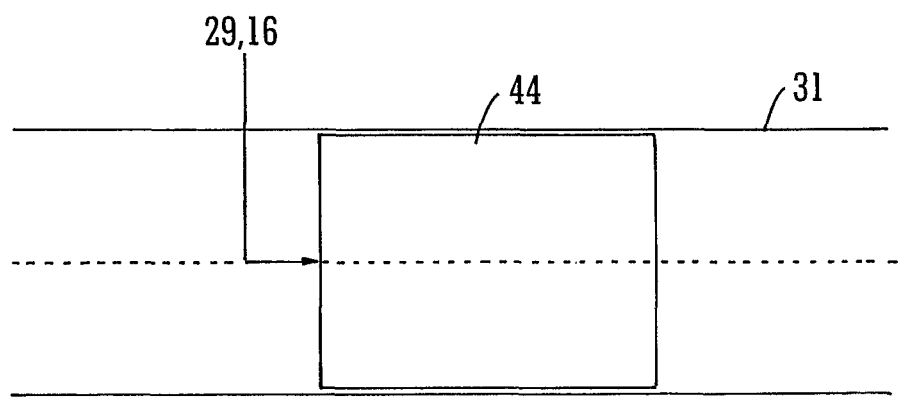
Figure 18:
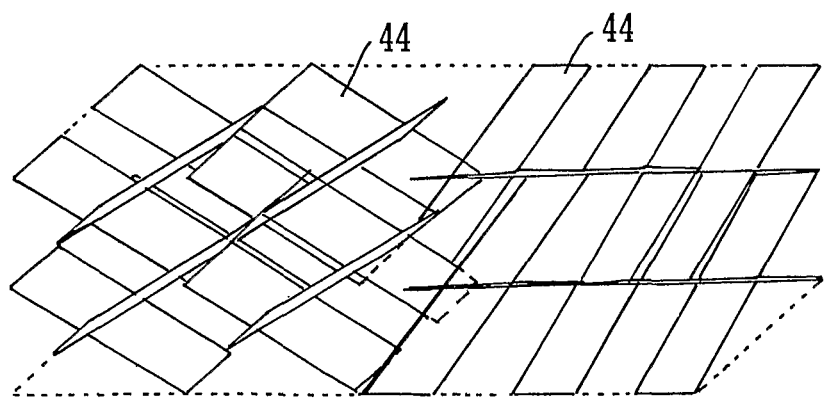
Figure 19:
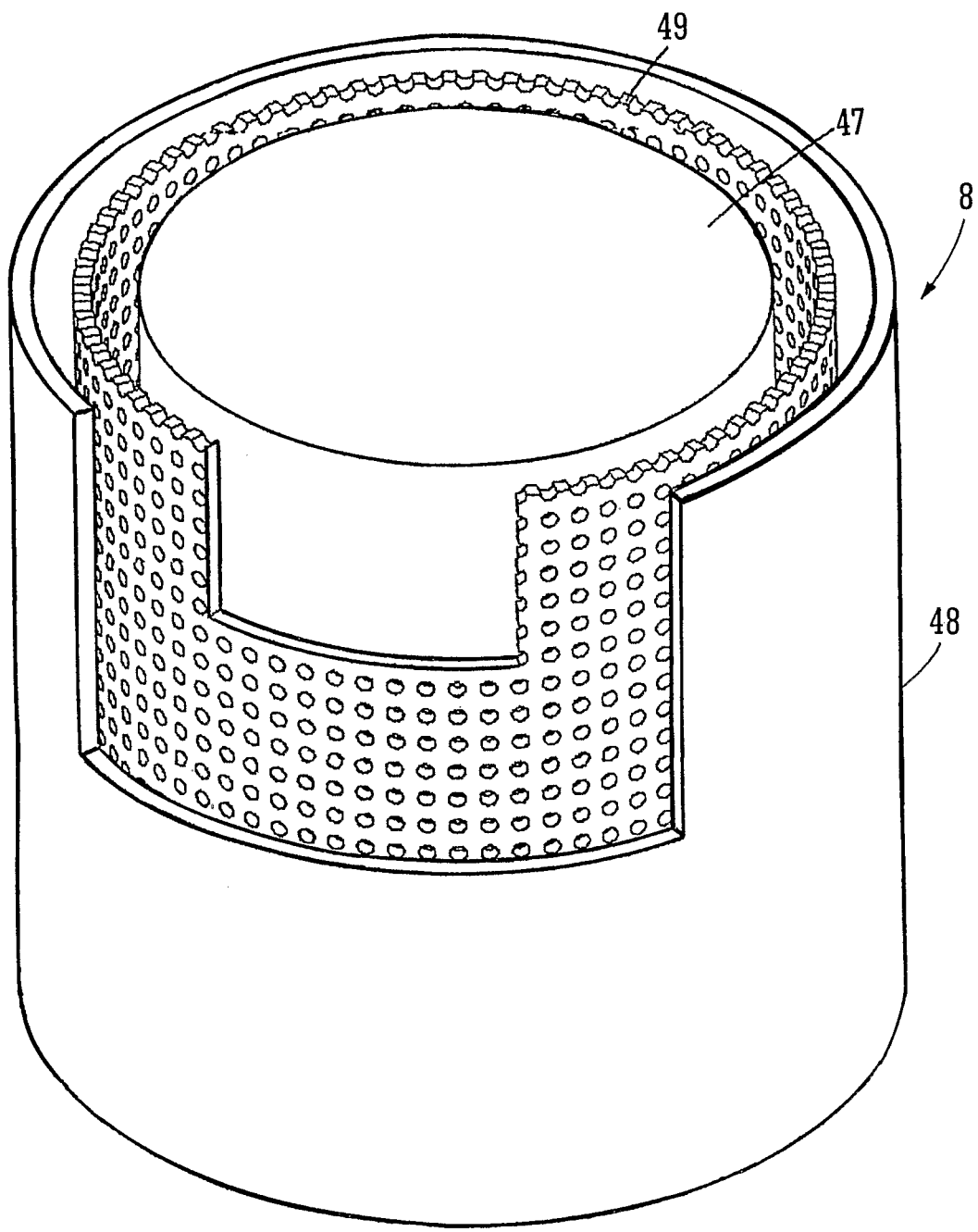
Figure 20:
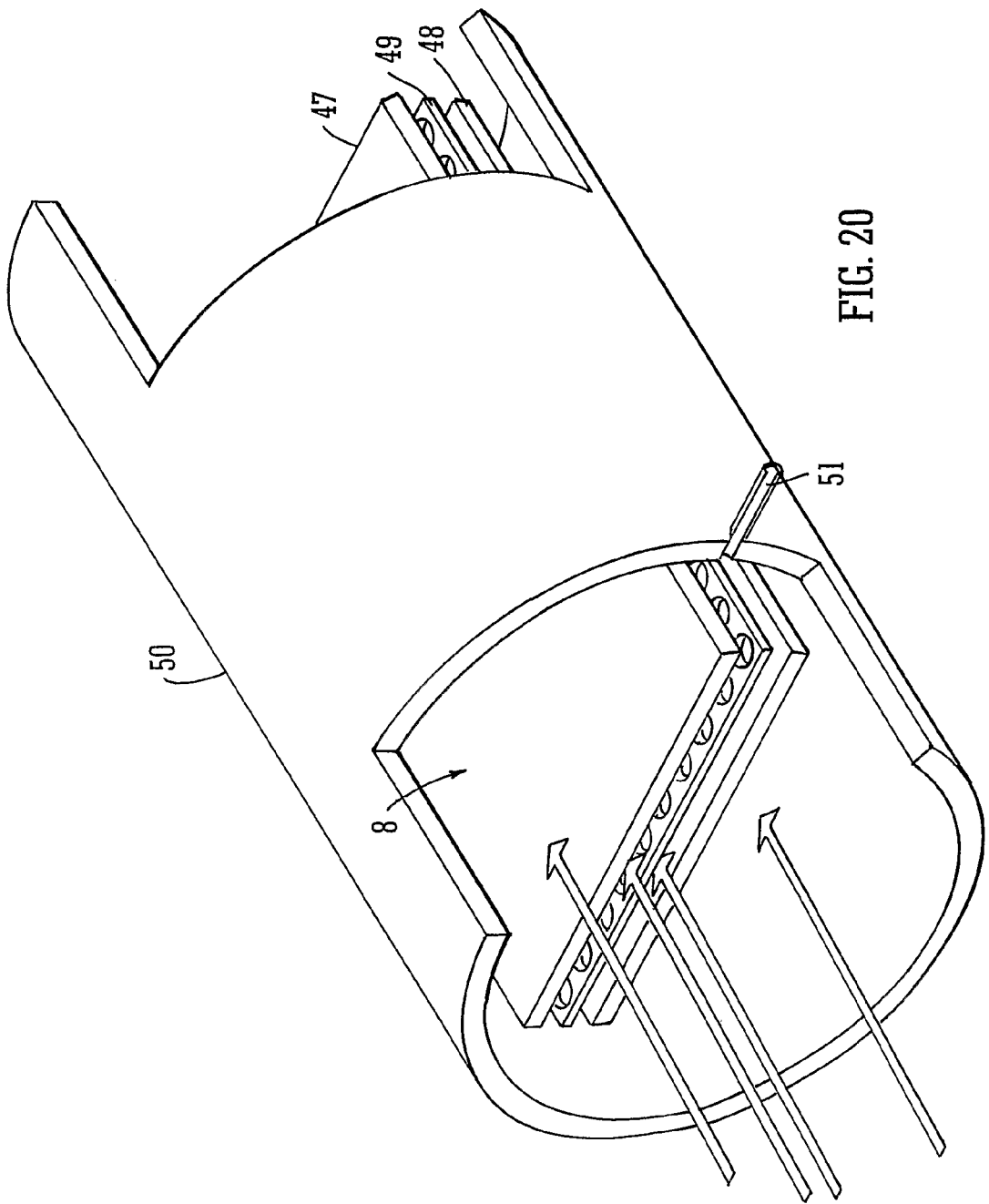

Preferred embodiments of the invention will now be described by way of example only and with reference to the accompanying drawings in which:

FIG. 1A is a schematic of a water treatment system fitted with an external electrodialysis cell, FIG. 1B is a schematic of a water treatment system fitted with an in-line electrodialysis cell;

FIG. 1C is a schematic of a water treatment system having an electrodialysis cell in parallel with a cavitation unit, FIG. 2 shows an embodiment of a cavitation unit, FIGS. 3 to 5a show various cavitation bodies with different means of securing the cavitation body in a pipe, FIGS. 6 to 9 show various alternative cavitation body shapes, FIGS. 10 and 11 are plots of pressure against distance along the cavitation unit for a cavitation unit of the type shown in FIG. 8, FIG. 12 shows two embodiments of arrays of cavitation units for increasing the amount of water which can be treated, FIG. 13 shows the arrays of FIG. 12 in cross-section, FIG. 14 shows an arrangement of an injector in a pipe, FIG. 15 is a diagram showing the detail of a gas/steam injector, FIG. 16 shows an alternative injector arrangement, FIG. 17 is a schematic of a static mixer in a pipe, FIG. 18 shows a possible static mixer configuration, FIG. 19 shows a partial cut-away view of an electrodialysis cell, and FIG. 20 shows an alternative electrodialysis cell arrangement in partial cut-away view.

The embodiments of FIGS. 1A and 1B are intended for use as a ballast water treatment system and is therefore described below in this context, but it will be appreciated that other uses for the described system exist, and that the system can be adapted to suit different requirements.

FIG. 1A illustrates a first embodiment of a treatment system. The water is filtered and then treated by a cavitation unit 10, a gas injection unit 14 and an electrodialysis cell 8. This combination of treatments causes damage and death to the organisms in the water. As well as affecting organisms in the water, nitrogen added to the water at the injection unit 14 reduces the level of dissolved oxygen in the water and reduces the potential of re-growth of organisms as well as reducing the weathering of coatings and the speed of corrosion. Furthermore, the reduction in oxygen is thought to prolong the effect of oxidants introduced into the water via the product of the electrodialysis cell from the electrodialysis cell 8. By controlled atmosphere management when the ballast tanks are empty by using nitrogen, these effects are enhanced further.

During filling of the ballast tanks, ballast water is pumped from the sea through an inlet pipe 1 by the use of the ship's ballast pump system 2. After the pump 2, water flows through a pipe and is filtered through a first filter 4, which filters larger particles from the water. These form a sludge which is discharged at the point of ballast uptake.

Downstream of the first filter 4, a pressure booster may optionally be installed. The pressure booster can be used to maintain the level of water pressure needed for successful treatment in the units further downstream.

Water then continues to flow into the cavitation unit 10. In the cavitation unit 10 hydrodynamic cavitation is induced by a rapid acceleration of the fluid flow velocity, which allows the fluid static pressure to rapidly drop to the fluid vapour pressure. This then leads to the development of vapour bubbles. After a controlled period of time which allows bubble growth, a rapid controlled deceleration then follows. This causes the fluid static pressure to rise rapidly which causes the vapour bubbles to violently collapse or implode exposing any organisms or the like in the water to the high intensity pressure and temperature pulses, which breaks down the organisms in the water. The cavitation unit 10 is described in more detail below in relation to FIGS. 2 to 13.

After the cavitation unit 10, a part of the water flows through the electrodialysis cell 8. The remainder of the water is not treated by the electrodialysis cell 8, and can simply continue to flow along a pipe or conduit to the later treatment stages. In the embodiment of FIG. 1A the electrodialysis cell is fitted externally to the main flow conduit, and thus could be retro-fitted to an existing treatment system.

In an alternative embodiment, instead of or in addition to the treatment of incoming ballast water by the electrodialysis cell 8, another source of brine or saltwater 24 can be used as the input electrolyte for the electrodialysis cell 8. This could be brine produced as a by-product of freshwater production or in a dedicated brine production plant, such as a reverse osmosis plant for example.

The source of brine or salt water can also be use to provide a boosting effect to the salt content of the water when the system is used to treat fresh water or weakly brackish water. As discussed above, this enables electrodialysis treatment of otherwise untreatable water, and also can be used to reduce electricity consumption.

The electrodialysis cell 8, which is described in more detail below with reference to FIG. 19, produces a diluate stream 11 and a concentrate stream 12. These two streams progress to a pH balancer or mixing unit 13, which produces a product of the electrodialysis cell 17 that is directed back into the main water flow, and depending on the composition of the product 17, the mixing unit 13 may also give out a residue of diluate 18. The mixing unit 13 includes a pump or the like to control the amount of diluate 11 which is added to the concentrate 12 to form the optimum product of the electrodialysis cell 17. In an alternative arrangement, as discussed above, the mixing unit may be within a pressurised closed circuit, with pressure provided by the pressure drop over a parallel cavitation unit. In this case, no pump is required.

Downstream of the point of injection of the product of the electrodialysis cell 17 there is a sampling and measurement point 15, which measures ORP and/or FAC and communicates the measured values to the mixing unit 13. These measurements monitor the effect of the electrodialysis cell 8 on the water and are used to control the operational parameters of the cell and/or the mixing ratio applied.

The diluate residue 18 may be reinjected into the incoming water prior to all treatment steps, and preferably also before the filter and/or the ballast water pump. Alternatively, it may be stored in a holding tank 25 or ship's bilge water tank 26.

In the embodiment shown, the gas injection unit 14 treats the water after the product of the electrodialysis cell 17 is returned to the main flow. However, in alternative embodiments the product 17 is returned to the main flow downstream of the gas injection unit 14, with the monitoring unit 15 likewise downstream of the gas injection unit 14, monitoring the water conditions after the product 17 has been mixed in.

In the gas injection unit 14, nitrogen gas 16 is injected into the incoming water using a steam/nitrogen injector or a gas/water mixer in order to achieve the desired level of nitrogen super-saturation in the water, which kills organisms and reduces corrosion by reducing the oxygen level. This also prolongs the treatment effect of the oxidants in the water. Embodiments of the injection unit 14 are described in more detail below with reference to FIGS. 14 to 18.

Downstream of the treatment units, treated water is distributed by the ship's ballast water piping system 23 to respective ballast water tanks. Here, excess gas is evacuated until a stable condition is achieved. This is regulated by means of valves integrated with the tanks ventilation system. These valves ensure stable conditions in the tank during the period the ballast water remains in the tank, in particular a high level of nitrogen super-saturation and a low level of dissolved oxygen in the water. Maintaining the level of super-saturation leads to an ongoing water treatment both by the super-saturation itself and also by oxidants introduced by the electrodialysis cell 8. The treatment thus results in treated water that continues to kill or disable any surviving organisms whilst the water is stored in the ballast tanks and act as a preventive measure against re-growth.

Water is then left to rest in the ballast water tanks. When the ballast water is discharged, water flows through a discharge treatment process that returns the oxygen content of the water to an environmentally acceptable level for discharge. The water is pumped from the ballast tanks and passes through the gas injection unit 14. This is used to return oxygen to the water as air replaces nitrogen as the injection gas. Optionally, the water may be re-treated by the cavitation unit 10 as it is discharged.

A second embodiment of a treatment system is shown in FIG. 1B. This is generally the same as the embodiment of FIG. 1A, but the electrodialysis cell 8 is placed in-line with the main flow rather than external to it. The water flows through an electrodialysis cell 8 such as that described in more detail below with reference to FIG. 20. In this embodiment, the mixing unit 13 may be installed as part of the in-line cell. As with the embodiment of FIG. 1A, the cell 8 produces a diluate stream 11 and a concentrate stream 12 by treating a part of the water. The remainder of the water is allowed to pass the in-line cell 8 untreated and it is mixed with the product of the electrodialysis cell 17 as discussed above. An external source of salt water or brine 24 may still optionally be used.

As discussed above in relation to FIG. 1A, in an alternative to the embodiment of FIG. 1B, the gas injection unit 14 can inject gas upstream of the point where the product 17 is mixed with the main water flow. This could be achieved by the injection of gas upstream of the inlet to the electrodialysis treatment, or the gas injection unit 14 can inject gas into the water flow that is not treated by the electrodialysis cell 8, and thus the electrodialysis treatment of a part of the water and the nitrogenation of the remainder of the water can occur in parallel.

A further arrangement of the components of the water treatment system is shown in FIG. 1C. In this system, water is pumped though an inlet 1 by a ballast pump 2, and then filtered by a first filter 4 as discussed above. The flow of water is then split, with a small proportion of about 0.2% by volume being routed through an electrodialysis cell 8, and the remainder passing through a cavitation unit 10. It should be noted that the electrodialysis cell operates as discussed in relation to FIGS. 1A and 1B, and that other features relating to the electrodialysis cell 8 as shown in FIGS. 1A and 1B may be present, such as the holding tank 25 or ship's bilge water tank 26.

After the electrodialysis cell 8 and cavitation unit 10 the product 17 of the electrodialysis cell 8 is mixed with the water treated by the cavitation unit, and this water then flows to the gas injection unit 14. In this embodiment, the gas injector is shown acting on only a part of the water flow instead of being fully in line with the water flow as in FIGS. 1A and 1B. It should be noted that the arrangements of the gas injector 14 can be interchanged between the embodiments of FIGS. 1A, 1B and 1C. With the arrangement shown in FIG. 1C nitrogen is injected into a part of the water flow, which is less that 15% by volume of the total, perhaps 10% by volume. The nitrogen is injected in a sufficient amount to ensure that the water is super-saturated with nitrogen. When the nitrogenated water flow is reintroduced to the main water flow turbulence from the combining flows, or alternatively a static mixer, is used to promote mixing of the two water flows and ensure that the entire water flow is nitrogenated to a sufficient level to have the desired water treatment effect.

After the introduction of nitrogen, the treated water passes through pipe 23 to the ballast tank, where it is stored. As with the embodiments above, when it is necessary to discharge the water from the ballast tank, the system is arranged to route the outgoing water through a treatment process including introduction of oxygen to re-oxygenate the water, and optionally a repeated cavitation treatment.

FIGS. 2 to 13 show embodiments of the cavitation unit 10. Cavitation is a process of nucleation in liquids, induced by the fall of the local static pressure below the local vapour pressure at constant temperature. The fall of the local static pressure causes a liquid to boil, which leads to a development of small bubbles of vapour. An increase of the static pressure causes these vapour bubbles to collapse.

A high pressure is generated in the last phase of the bubble collapse which literature assumes to lead to the emission of a shock wave. The shock wave can be launched with a shock velocity of almost 4000 m/s and a shock amplitude decay faster than $1/r$. The pressure pulse in the vicinity of a bubble has been reported to be up to 1 GPa in some cases. High local temperature spots with a temperature up to 7800K have also been reported in the literature as a consequence of the cavitation bubble collapse. If cavitation occurs near a rigid surface, the bubbles collapse asymmetrically, often forming a fast-moving water jet. This jet may create surface damage and possibly lead to jet-induced tissue damage, when an organism or the like is in a vicinity of the collapsing bubble. The jets, high pressures and temperatures created by collapsing cavitation bubbles have a destructive effect on micro-organisms in water by causing damage to the tissue of the organisms which consequently leads to the death of the organisms.

However, fast moving jets and high pressure and temperature spots occur in close vicinity of the collapsing bubble and therefore only affect organisms, which are close enough to the bubble at the time of collapse. In order to utilise the energy, released at the implosion of the bubble more effectively, exposure of the organisms should be targeted. For water treatment applications in general and ballast water treatment applications in particular, this may be achieved by inducing cavitation in or near a small gap through which treated water flows.

In the preferred cavitation unit 10, hydrodynamic cavitation is induced by a rapid controlled acceleration of the fluid, which allows the fluid static pressure to rapidly drop to the fluid vapour pressure, this then leads to the development of vapour bubbles. After a controlled period of time which allows bubble growth, a rapid controlled deceleration then follows. This causes the fluid static pressure to increase rapidly which causes the vapour bubbles to violently collapse or implode, exposing the organisms to high intensity pressure and temperature pulses.

The geometry of the cavitation unit 10 has been designed to utilise the observed synergetic effects of the presence of surfaces in relation to bubble generation and the importance of the proximity of the imploding bubble to the target object. Different configurations of the design have been developed with different characteristics, including repeatable cavitation, all based on the same preferred geometric design.

The cavitation unit 10 creates circumferential cavitation about a cavitation body in the form of a torpedo-like shape 30 as shown in FIG. 2. The torpedo like-shape 30 is advantageous as it is generally cylindrical and can be easily fitted into a pipe 31, such as a ballast water pipe or any pipe carrying water. The particular shape of the torpedo 30 can be designed to provide the appropriate pressure drop in order to induce the maximum cavitation given any particular circumstance. The preferred shapes optimise bubble growth and size distribution, in particular in order to bring micro-organisms close to the cavitation bubble collapse zone to achieve the maximum destructive effect of the cavitation unit 10.

The basic parameters for the manipulation on the torpedo 30 of FIG. 2 are the length A, radius B, the gap width C, angle D, radius of the torpedo nose E and length of the torpedo middle section F. These parameters may be altered to achieve particular cavitation characteristics. In general, the cavitation unit 10 is arranged to provide an elongate area where cavitation is instigated by constriction of the flow path, which in this embodiment is achieved by a narrow annular passage. Liquid flows from left to right as viewed in FIG. 2. The velocity of the water is increased and the pressure decreased at the torpedo nose E, and hence cavitation bubble growth is initiated. The bubbles grow along the torpedo middle section F, and then implode as the water pressure increases again.

FIGS. 3 to 5a are four different versions of the cavitation body 30 showing how assembly of the torpedo unit into the ballast or the waste water pipe 31 can be achieved.

Figure 3:
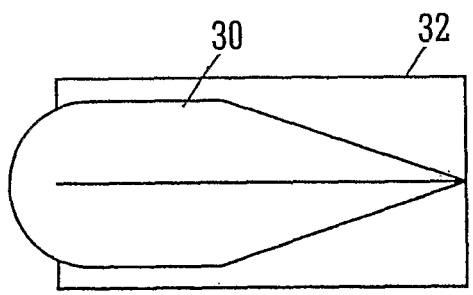

FIG. 3 illustrates fins 32 applied to fit the torpedo 30 in the pipe 31. The length, angle, height, depth and number of fins 32 can be varied.

Figure 4:
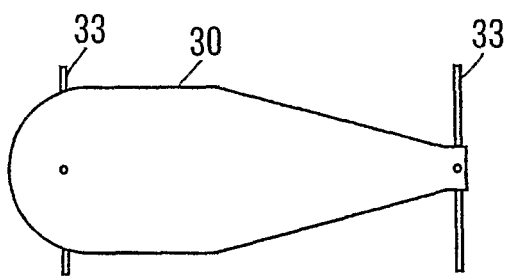

FIG. 4 illustrates pins 33 applied to fit the torpedo in the pipe. The pins 33 are attached to the torpedo 30 at the front and rear of the unit. The length, diameter, position and number of the pins 33 can be varied.

The fins 32 and the pins 33 are designed to provide a secure fit of the torpedo 30 in the water pipe 31. Furthermore, the design is such that they affect the developed cavitation area as little as possible in order for the torpedo unit 30 to provide the maximum possible cavitation.

Figure 5:
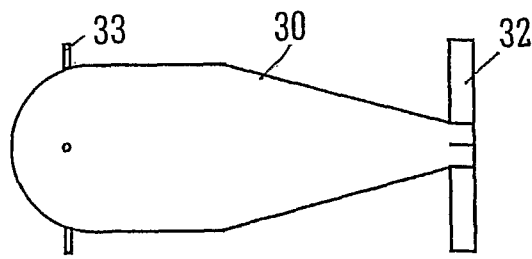

FIG. 5 illustrates both pins 33 and fins 32 applied to fit the torpedo 30 in the pipe 31. Four pins 33 are attached to the torpedo unit in the front of the unit and four fins 32 are attached to the torpedo unit at the back of the unit.

Figure 5A:
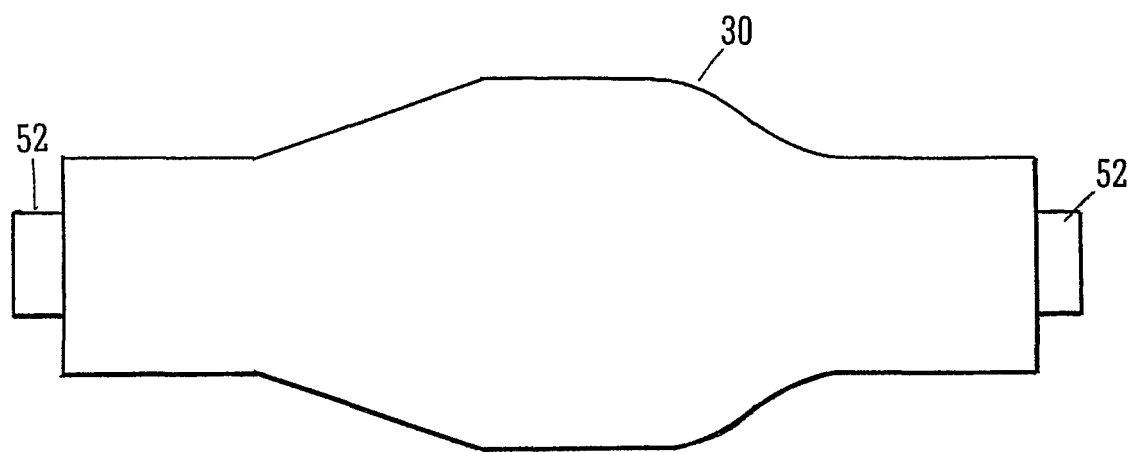

FIG. 5a shows a torpedo 30 of an alternative design, where the torpedo 30 is held in place by lugs 52, which slot into supports. These lugs 52 remove the need for pins or fins and hence avoid any obstruction to the fluid flow other than the torpedo itself, and hence promotes a more uniform fluid flow.

FIGS. 6 to 9 are various alternative designs of the torpedo 30. There are two different plain versions of the torpedo 30 in FIGS. 6 and 7, which provide two different possibilities of assembly of the unit into the water pipe. In particular, FIG. 7 shows a torpedo 30 with a blunt trailing edge 34, which may be used for easier mounting of the rear end of the torpedo 30 to the pipe 31. The plain version of the torpedo 30 induces cavitation by causing a single rapid drop and rise in pressure over the unit and a cavitation collapse zone at the end of the middle section of the torpedo 30.

In addition to the plain version there are two more versions of the torpedo unit as shown in FIGS. 8 and 9. These two versions can have the rear part of the unit designed as shown in FIG. 6 or as in FIG. 7.

FIG. 8 shows a torpedo with an undulating profile 35 that induces multiple cavitation zones by multiple drops and rises of pressure. With the torpedo 30 of FIG. 8 cavitation collapse zones are achieved behind each of the rippled sections of the unit. This is advantageous as the destructive effect of the cavitation is repeated on each section.

FIG. 9 shows a torpedo 30 with a section of irregular surface 36. The surface could be a knurled surface or a dimpled surface for example. The use of an irregular surface 36 enhances the generation of bubbles due to the cavities on the surface of the torpedo unit 30.

FIGS. 10 and 11 show the vapour pressure profiles for two different designs of the undulating surface version of the torpedo 30 shown in FIG. 8. The graphs have pressure on the vertical axis and the horizontal axis represents distance along the cavitation unit. The low pressure points are below atmospheric pressure P. The graph in FIG. 10 shows the pressure profile for a torpedo 30 with two ripples, i.e. one less than the torpedo shown in FIG. 8. The graph in FIG. 11 shows the pressure profile for a torpedo 30 with three ripples, such as the torpedo 30 of FIG. 8.

The number of ripples on the middle section, the position of the ripples on the middle section of the torpedo and the minimum and the maximum diameter of the ripples can be varied in order to achieve the desired cavitation effect. The parameters are chosen in order to achieve the maximum number of cavitation zones and maximum area/volume of cavitation.

It will be appreciated that the features of FIGS. 6 to 9 could be applied to torpedoes 30 having the same general shape shown in any of FIGS. 3 to 5a, as well as to other shapes of cavitation body.

FIG. 12 shows two different versions of arrays 37 of multiple cavitation units 10. These illustrate how a standard cavitation unit 10 may be multiplied with a number of units in order to provide different ranges of flow rate capacities. The versions should allow more control and flexibility than a single torpedo version, which is limited by the need to maintain a narrow annulus in order to maximise the effect of cavitation. By having multiple cavitation units 10 the efficacy of the cavitation effect can be maintained without restricting the use of higher flow rates.

In one version a large torpedo 10' is positioned in the middle of the water pipe 31 with smaller torpedoes 10" placed around a large torpedo. The smaller torpedoes 10" produce cavitation as discussed above. The large torpedo 10' can simply be for supporting the smaller torpedoes 10" and in this case would not have any cavitation function, although the front and rear ends of the torpedo are profiled to direct water flow to the smaller torpedoes 10". Alternatively the large torpedo 10' could operate in the same way as the smaller torpedoes 10" and the torpedoes 10 as discussed above in order to produce cavitation to treat the water. The diameter of the new unit X can be equal, smaller or larger than the diameter of the water pipe Y. The ratio of X/Y depends on the desired water flow rate and the number of torpedo units used in the multiple unit versions.

In an alternative version a number of small torpedoes 10" are assembled into a water pipe 31 without the use of a larger unit 10'. In the embodiment shown the smaller torpedoes 10" form two concentric rings about a central small torpedo 10"

FIG. 13 shows cross-sectional views of the arrays of FIG. 12, with higher or lower numbers of the smaller cavitation units 10". Different number of small torpedoes 10" may be placed into a unit, depending on the flow-rate requirements.

FIG. 14 shows a gas injector unit 14 comprising an injection nozzle 43 positioned in a pipe 31. Nitrogen 16 or air 29 is injected into the water flow path. Steam 38 may also be injected to improve the mixing of the gas 16, 29 into the water as discussed below. Gas can be injected into water using a gas/steam injector nozzle 43 as shown in FIG. 15, gas injection into a constriction nozzle in a pipe 31 as shown in FIG. 16 or a gas/water static mixer 44 as shown in FIGS. 17 and 18. The features of FIGS. 16 to 18 are known gas mixing systems that can be utilised in the present water treatment apparatus. In the present water treatment process, nitrogen 16 is injected through the injector unit 14 during the filling part of the treatment and the air 29 is injected during the discharge part of the treatment.

As discussed above, the injection of gas, and in particular the injection of nitrogen, can be carried out on only a part of the water flow instead of injecting gas into the entire water flow. The gas injector units described herein could of course be placed in the main flow path, as in FIGS. 1A and 1B, or could be placed in a separate flow path, along which only a part of the water flows before being returned to the main flow, as in FIG. 1C.

In preferred embodiments steam 38 is injected at the same time as the gas 16, 29 as in FIG. 14. The use of steam 38 aids mixing of the gas 16, 29 into water and reduces the amount of gas 16, 29 required. In addition, steam injection results in a generated pumping effect. This is because steam injection leads to a higher speed jet behind the injection point that accelerates the fluid, creating an additional suction, which is felt in the system as an additional pumping effect. Further, injected steam generates pressure pulses, which affect any unwanted matter present in the water, and provide a physical water treatment effect in addition to the effect of the gas/steam injector on the dissolved gas content of the water.

To achieve best effects of steam and gas injection, some conditions for injector design must be followed. These involve an appropriate regime of steam condensation, the generation of a high speed two-phase jet, appropriate gas bubble sizes and also avoiding choking of the injector.

Steam condenses in water in different regimes depending on the amount of injected steam, the temperature difference between the steam and water, the diameter of the steam injector, and the amount of impurities/gas in the steam. There are three main regimes of condensation of steam into water. These are chugging, bubbling and jetting. Different regimes affect the mixing of gas into water differently. The most desirable regime for the purpose of the mixing is a jetting regime. In general, the jetting regime is achieved effectively when the amount of injected steam is higher than 150 kg/($m^2$s).

In a two-phase jet, steam injected into water generates a jet downstream of the injection. The jet enhances the mixing of the gas into water and provides an additional pumping effect.

If the exit diameter of the injector is too small then steam starts to choke in the injector. Choking of the steam reduces the mixing process and should be avoided.

Gas can be mixed with the steam prior to injection. Gas in the steam reduces the condensation rate because the bulk of the gas is pushed to the surface of the condensing steam which must therefore condense through the gas layer. However, if the amount of the gas is too high, steam condenses inside the mixing chamber of the injector, which reduces the mixing effect.

The range of gas bubble sizes also affects the mixing performance. The range is dependent on the amount of injected steam, the amount of injected gas, the temperature of the water and the gas, the pressure and the condensing regime etc.

FIG. 15 shows a preferred design of a steam/gas injector nozzle 43. The parts are shown in close up view. The nozzle structure 43 of FIG. 15 is small in comparison to the size of the pipe 31 and would be placed at the centre of the pipe 31 as shown in FIG. 14.

The injector nozzle 43 consists of three main parts. In an inlet region 40 steam 38 and gas 29, 16 are supplied into the injector nozzle 37. The injector nozzle 43 is formed of a small pipe 45 within a larger pipe 46. Steam 38 is supplied through the small pipe 45 in the centre of the injector nozzle 43 and gas 29,16 is supplied in the area defined around the steam pipe between the larger pipe 46 and the small pipe 45. The water flow is outside of the larger pipe 46.

Following the inlet region is a mixing region 41 where steam 38 and gas 29,16 are mixed. In FIG. 15 the mixing area is formed by the small pipe 45 ending, and the larger pipe 46 continuing. The gas/steam mixture is injected into the water flow through a diverging region 42 of the injector nozzle 43. The total length of the injector, lengths of the different regions of the injector, the diverging angle, the radius of the main pipe 46, the outlet of the injector and the radius of the steam pipe 45 can be varied in order to achieve the desired mixing effect.

Water is present in the injector nozzle 43 prior to the steam and gas supply. Steam and gas are also not fully mixed in the mixing chamber prior to the injection into the water. To achieve full mixing a different injector design could be used with a converging region in place of the diverging region 42. However, the present design assures no or little choking in the injector nozzle 43, which increases the mixing performance.

FIG. 16 shows an alternative gas injector unit 14. In this arrangement gas 29,16 is injected into a constriction in the pipe 31.

FIG. 17 shows the use of a static mixer 44. The static mixer 44 is fixed in the centre of the water flow. Gas 29, 16 is supplied in the water flow upstream of the mixer and is mixed with water by turbulence during the flow through the mixer 44. The gas may be supplied using nozzle arrangements as discussed above, or by alternative conventional systems.

An example of a static mixer 44 is shown in FIG. 18. An angular turbulent highly-mixed multiphase fluid flow through the static mixer 44 is achieved by connecting separate plates together as shown. The outer circumference of the static mixer is circular allowing the unit to be fitted into the pipe 31.

The operation of the electrodialysis cell 8 will now be explained. Embodiments of the structural arrangement of electrodialysis cells 8 are described below with reference to FIGS. 19 and 20. For each of these embodiments, the chemical processes are basically the same. As discussed above, electrodialysis is an electro-membrane process where ions are transported through ion permeable or ion selective membranes in a fluid system. In the simplest implementation of an electrodialysis cell a single membrane or membrane pair is placed between two electrodes. An electric charge established by applying a voltage between two electrodes allows ions to be driven through the membrane provided the fluid is conductive. The voltage is applied by power connection points of a conventional type, which are not shown in the drawings. The two electrodes represent respectively the anode and the cathode. The electric charge creates different reactions at the different electrodes. At the anode, the electrolyte will have an acidic characteristic whilst at the cathode, the electrolyte will be characterised by becoming alkaline. Membranes used in electrodialysis are chosen for the ability to create selective transport. Thus, this allows the alkaline solution to be kept separate from the acidic solution.

Various reactions which occur in an electrodialysis cell where the incoming electrolyte is ballast water taken from a ballast water pipeline (i.e. sea water) are shown in Table 1 below. Thus, the raw electrolyte can have characteristics such as conductivity, which alter the effect of the electrodialysis process.

TABLE 1

| Reactions at the anode: | Reactions at the cathode: |
|---|---|
| $2Cl^- - 2e \rightarrow Cl_2$ | $2H_2O + 2Na^+ + 2e \rightarrow 2NaOH + H_2$ |
| $2H_2O - 4e \rightarrow 4H^+ + O_2$ | $2H_2O + 2e \rightarrow H_2 + 2OH^-$ |
| $Cl_2 + H_2O \rightarrow HClO + HCl$ | $O_2 + e \rightarrow O_2^-$ |
| $HCl + NaOH \rightarrow NaCl + H_2$ | $O_2^- + H^+ \rightarrow HO_2$ |
| $Cl^- + 2OH^- - 2e \rightarrow ClO^- + H_2O$ | $O_2 + H_2O + 2e \rightarrow HO_2^- + OH^-$ |
| $3OH^- - 2e \rightarrow HO_2^- + H_2O$ | $O_2 + 2H_2 + 2e \rightarrow H_2O_2 + 2OH^-$ |
| $HO_2^- - e \rightarrow HO_2$ | $H^+ + e \rightarrow H^\bullet$ |
| $OH^- - e \rightarrow OH^\bullet$ | $H^\bullet + H^\bullet \rightarrow H_2$ |
| $OH^\bullet + OH^\bullet \rightarrow H_2O_2$ | $OH^\bullet + OH^\bullet \rightarrow H_2O_2$ |
| $HClO + H_2O_2 \rightarrow HCl + O_2 + H_2O$ | $H_2O_2 + OH^\bullet \rightarrow HO_2 + H_2O$ |
| $ClO^- + H_2O_2 \rightarrow {}^1O_2 + Cl^- + H_2O$ | $H_2O_2 \leftrightarrow H^+ + HO_2^-$ |
| | $H_2O_2 + OH^- \leftrightarrow HO_2^- + H_2O$ |
| | $OH^- + HO_2^- \leftrightarrow O_2^{2-} + H_2O$ |
| | $O_2^{2-} + H_2O_2 \rightarrow O_2^- + OH^- + OH$ |
| | $OH + H_2O_2 \rightarrow H_2O$ |

Table 2 below illustrates typical properties for an acidic solution produced at the anode and an alkaline solution produced at the cathode. The acidic solution forms the concentrate stream and the alkaline solution forms the diluate stream.

TABLE 2

| | pH | FAC (ppm) | ORP (mV) |
|---|---|---|---|
| Acidic solution (at the anode) | 2-3.5 | 400-800 | 1100-1200 |
| Alkaline solution (at the cathode) | 11-12.5 | — | 800-900 |

The two separated streams are mixed in a ratio providing a product of the electrodialysis cell and optionally a residue with typical characteristics shown in Table 3.

TABLE 3

| | pH | FAC (ppm) | ORP (mV) |
|---|---|---|---|
| Concentrate | 7.5-8.5 | 500-800 | 750-800 |
| Residue | 11-12.5 | | 800-900 |

In order to tailor the chemical characteristics of the two streams, cross-treatment may be applied. This may constitute of an arrangement allowing all of or a portion of one or both streams to be re-injected at the entrance to the opposite compartment to the compartment from which it arrived from. Thus, the concentrate stream produced by the anode could be cross-treated by re-injection into the cathode side of the cell. The characteristics of the stream(s) expressed by pH, ORP and FAC may by this method be further tailored and enable the amount of residual diluate after mixing to be reduced if mixing is applied in addition.

Recirculation of respective flows from respective compartments may also be applied in order to tailor the characteristics of the two streams in order to improve the desired characteristics of the end product following mixing, and also with the aim of reducing the amount of residual diluate.

The mixing ratio will depend on the "quality" of the raw electrolyte, the size of the electrodes and the power applied.

The product 17 of the electrodialysis cell 8 is introduced into the main flow, after the cavitation treatment. The nitrogen injection can occur before or after the product 17 is added.

The ratio between concentrate/residue and ballast water flowing through the line is controlled by monitoring the ORP and FAC upstream at a monitoring station 15. The characteristics and amounts of concentrate and dilute reinjected into the main flow are controlled by monitoring Oxygen Reduction Potential (ORP) and/or the consumption of Free Available Chlorine (FAC). The range for desired values of ORP is 300-500 mV. The immediate initial values of FAC following reinjection is preferably between 2 and 4 ppm dropping to 0.1-0.4 ppm after a period of 1 hour.

FIG. 19 illustrates an embodiment of an electrodialysis cell 8 that can be used to treat water, in the system of FIG. 1A. Water is passed through an annular passage formed between a solid cylindrical anode 47 and a hollow cylindrical cathode 48. To form the electrodialysis cell 8 an ion exchange or ion selective membrane 49 is placed between the anode 47 and the cathode 48. The cathode 48 and the membrane 49 are shown in cut-away view. As the water forming the incoming electrolyte passes through the annular passage, an acidic concentrate solution 12 is formed at the anode side of the membrane 49 and an alkaline diluate solution 11 is formed at the cathode side of the membrane 49. A portion of the diluate stream 11 may be separated off, and all of or the remaining part of the diluate stream 11 is mixed with the concentrate stream 12 to form the product of the electrodialysis cell 17 as discussed above.

An alternative embodiment of an electrodialysis cell 8 for in-line use is shown in FIG. 20. The electrodialysis cell 8 includes a plate shaped anode 47 and cathode 48, sandwiching a membrane 49. The cell 8 is housed within a pipe 50, shown in partial cut-away view, and the pipe 50 transports all of the water flow in the direction shown by the arrows. The majority of the water will pass by on either side of the electrodialysis cell 8, with only a part of the water entering the electrodialysis cell 8 and flowing along between the anode 47 and the membrane 49 or between the cathode 48 and the membrane 49. On the anode and cathode sides reactions occur when electrical current is passed through the electrodes and thus a diluate stream 11 and concentrate stream 12 are produced at the cathode and anode sides respectively as discussed above.

In order to control the composition of the product of the electrodialysis cell 17 that is returned to the main water flow, a diluate removal flow path 51 is provided. The amount of diluate removed from the electrodialysis cell 8 is controlled based upon the measured ORP and/or FAC levels downstream of the electrodialysis cell 8. As discussed above, in some cases all the diluate will be mixed with the concentrate stream 12, such that there is no diluate removed. The concentrate stream 12 and the remainder or all of the diluate stream 11 are then reintroduced to the main water flow at the end of the electrodialysis cell 8. These two parts together form the product of the electrodialysis cell 17 although they are not mixed together until they are mixed along with the main water flow as the flow through and around the electrodialysis cell 8 progresses beyond the end of the cell 8.

To allow efficient treatment of higher flow rates by the electrodialysis equipment, a number of electrodialysis cells 8 can be placed in an array to treat water in parallel. Although it is possible to increase the size of the electrodialysis cell 8 to achieve the same effect, the construction of larger cells becomes more complicated, and so multiple smaller cells are preferred. In addition, the use of smaller cells allows for a more modular construction, which means that the same parts can be produced in bulk and combined together to produce systems for various different flow rates of ballast water or other water to be treated.

The invention claimed is:

1. A ballast water treatment apparatus for the treatment of ballast water, the apparatus comprising a cavitation unit, wherein the cavitation unit generates cavitation in the ballast water by flow of the ballast water into a constriction where cavitation bubbles are formed and then to an outlet where cavitation bubbles implode, and wherein the constriction includes an aperture that is elongate along a line normal to the flow direction.

2. An apparatus as claimed in claim 1, wherein the cavitation unit is arranged to treat the liquid by using cavitation to break down unwanted matter comprising organisms, microorganisms, organic waste, inorganic waste or long chain hydrocarbon molecules.

3. An apparatus as claimed in claim 1, wherein the cavitation unit is arranged such that at the point where the implosion of the bubbles begins the maximum distance from the edge of bubble to the unwanted matter is less than the radius of the bubble.

4. An apparatus as claimed in claim 1, wherein the aperture is formed by circular walls defining a narrow annulus.

5. An apparatus as claimed in claim 4, wherein the annulus has a width of around 1 to 2 mm and a diameter of 50 to 100 mm.

6. An apparatus as claimed in claim 1, wherein the aperture is formed by a cavitation body in a pipe.

7. An apparatus as claimed in claim 1, wherein a wall of the aperture has a non-uniform surface or roughened surface.

8. An apparatus as claimed in claim 1, wherein the cavitation unit comprises a plurality of constrictions such that the formation and implosion of bubbles is repeated.

9. An apparatus as claimed in claim 1, wherein the apparatus includes a plurality of cavitation units in an array such that liquid can flow in parallel through a number of cavitation units.

10. An apparatus as claimed in claim 9, wherein the array comprises a ring of cavitation units.

11. An apparatus as claimed in claim 1, wherein the aperture has a width of less than 5 mm.

12. An apparatus as claimed in claim 11, wherein the aperture has a width of less than 3 mm.

13. An apparatus as claimed in claim 12, wherein the aperture has a width of about 1 to 2 mm.

* * * * *